(12) United States Patent
Pyo

(10) Patent No.: US 10,317,789 B2
(45) Date of Patent: Jun. 11, 2019

(54) MONOCULAR STEREOSCOPIC CAMERA

(71) Applicant: YEON SYSTEMS CO., LTD., Seoul (KR)

(72) Inventor: Do-Yeon Pyo, Seoul (KR)

(73) Assignee: YEON SYSTEMS CO., LTD., Seoul (KR)

( * ) Notice: Subject to any disclaimer, the term of this patent is extended or adjusted under 35 U.S.C. 154(b) by 60 days.

(21) Appl. No.: 15/317,706

(22) PCT Filed: Jun. 24, 2015

(86) PCT No.: PCT/KR2015/006405
§ 371 (c)(1),
(2) Date: Dec. 9, 2016

(87) PCT Pub. No.: WO2015/199432
PCT Pub. Date: Dec. 30, 2015

(65) Prior Publication Data
US 2018/0180984 A1 Jun. 28, 2018

(30) Foreign Application Priority Data

Jun. 26, 2014 (KR) ........................ 10-2014-0078731

(51) Int. Cl.
*G02B 27/22* (2018.01)
*G03B 35/08* (2006.01)
(Continued)

(52) U.S. Cl.
CPC ............ *G03B 35/08* (2013.01); *G02B 27/22* (2013.01); *G03B 9/02* (2013.01); *G03B 17/561* (2013.01);
(Continued)

(58) Field of Classification Search
CPC ....... G03B 35/08; H04N 13/02; H04N 13/239
See application file for complete search history.

(56) References Cited

U.S. PATENT DOCUMENTS 6,512,892 B1  1/2003  Montgomery et al.
6,513,953 B1 * 2/2003  Itoh ...................... G02B 3/0062
                                                     348/E9.027
(Continued)

FOREIGN PATENT DOCUMENTS

EP    1085769 A2   3/2001
EP    2200271 A1   6/2010
(Continued)

OTHER PUBLICATIONS

International Search Report dated Jul. 30, 2015 for PCT/KR2015/006405 and English translation.
(Continued)

*Primary Examiner* — Noam Reisner
(74) *Attorney, Agent, or Firm* — Lucas & Mercanti, LLP

(57) ABSTRACT

A monocular stereoscopic camera according to the present invention uses a macro lens capable of performing proximity expansion shooting as a third image formation lens assembly or a telephoto lens having, in combination with a second image formation lens assembly, the characteristics of a macro lens. Thus, the monocular stereoscopic camera has an advantage in that the camera can use various first image formation lens assemblies, reduce a vignetting phenomenon, reduce the entire length thereof, remove n adjustment parameter, which is repetitive and replaceable, from among parameters requiring adjustment of an optical axis, and distinguish a parameter to be adjusted during shooting and an adjustment parameter which may be fixed during shooting once after adjustment, from each other. Thus, the camera can be easily and simply manipulated and operated and has a simple structure.

2 Claims, 17 Drawing Sheets

(51) Int. Cl.
*H04N 13/239* (2018.01)
*G03B 9/02* (2006.01)
*G03B 17/56* (2006.01)
*H04N 13/296* (2018.01)
*G02B 13/02* (2006.01)

(52) U.S. Cl.
CPC ......... *H04N 13/239* (2018.05); *H04N 13/296* (2018.05); *G02B 13/02* (2013.01); *H04N 2213/001* (2013.01)

(56) References Cited

U.S. PATENT DOCUMENTS

| | | | | |
|---|---|---|---|---|
| 7,280,283 | B1 * | 10/2007 | Kasai | A61B 1/00179 359/656 |
| 7,970,276 | B1 * | 6/2011 | Routhier | F16M 11/32 396/325 |
| 8,842,164 | B2 | 9/2014 | Kuroki | |
| 2010/0245546 | A1 * | 9/2010 | Kuroki | G03B 35/10 348/49 |
| 2010/0296807 | A1 | 11/2010 | Pupulin et al. | |
| 2012/0163791 | A1 * | 6/2012 | Juri | G03B 17/561 396/327 |
| 2013/0027522 | A1 * | 1/2013 | Yamada | H04N 13/239 348/47 |

FOREIGN PATENT DOCUMENTS

| | | |
|---|---|---|
| FR | 2923341 A1 | 5/2009 |
| JP | 2001-142166 A | 5/2001 |
| JP | 2010-081580 A | 4/2010 |
| JP | 2012-150448 A | 8/2012 |
| JP | 2013-025298 A | 2/2013 |
| KR | 10-0986286 B1 | 10/2010 |
| KR | 10-1162058 B1 | 7/2012 |
| KR | 10-1214855 B1 | 7/2012 |
| KR | 10-1244866 B1 | 3/2013 |
| KR | 10-1255803 B1 | 4/2013 |

OTHER PUBLICATIONS

European Search Report, Application No. 15812781.1, dated Sep. 6, 2017, Yeon Systems Co., Ltd.
The Extended European Search Report, 15812781.1-1562/3163371, dated Sep. 12, 2017.

* cited by examiner

[Fig. 1]
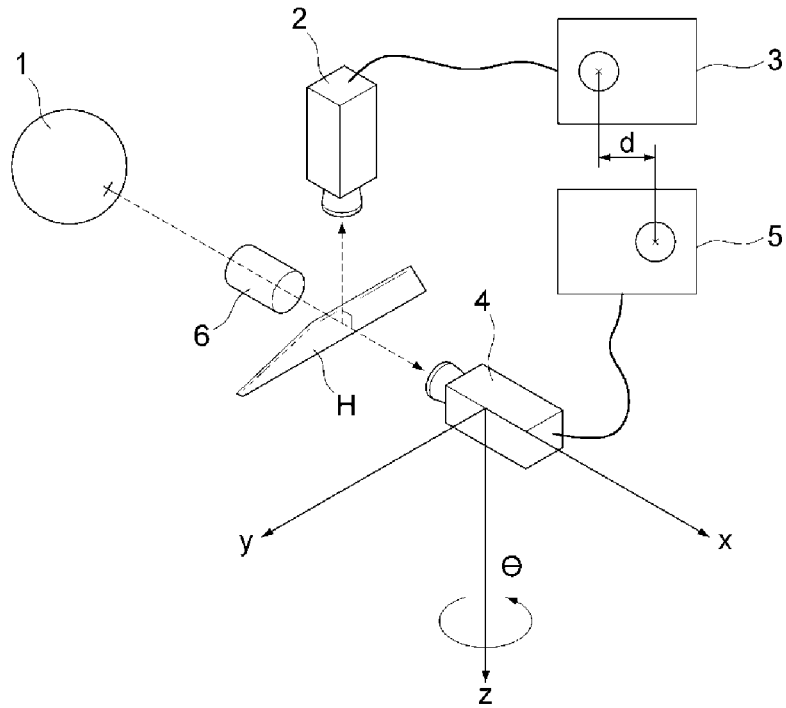
[Fig. 2]
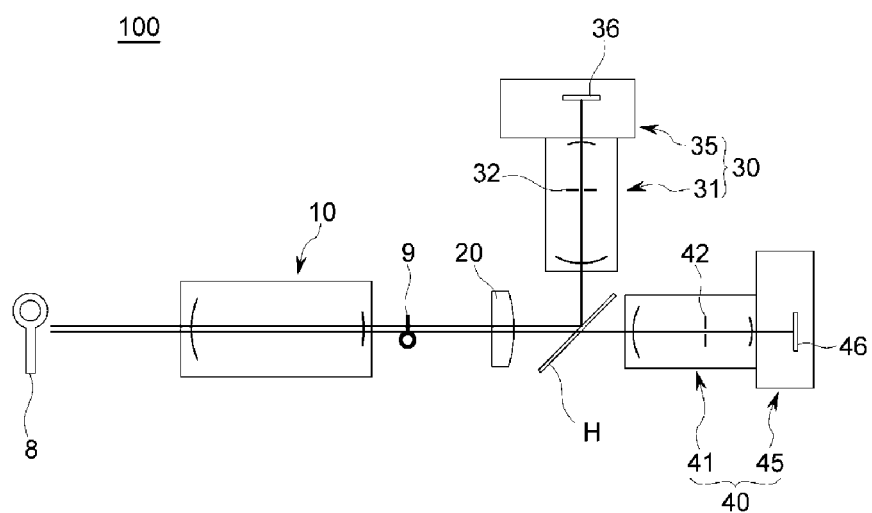

[Fig. 3a]
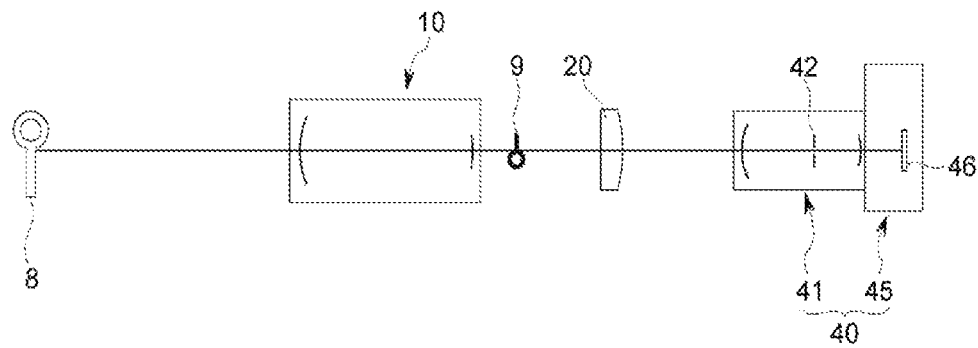
[Fig. 3b]
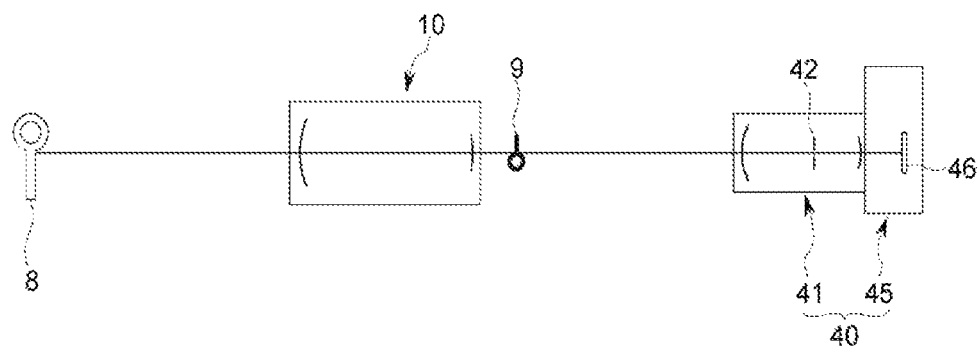
[Fig. 3c]
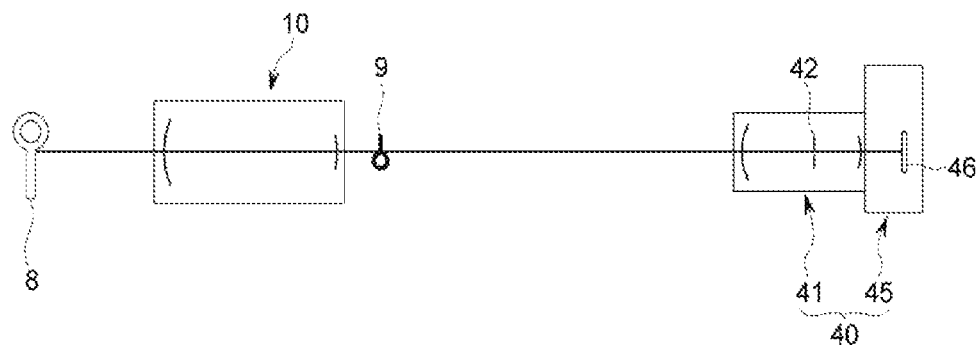

【Fig. 4】
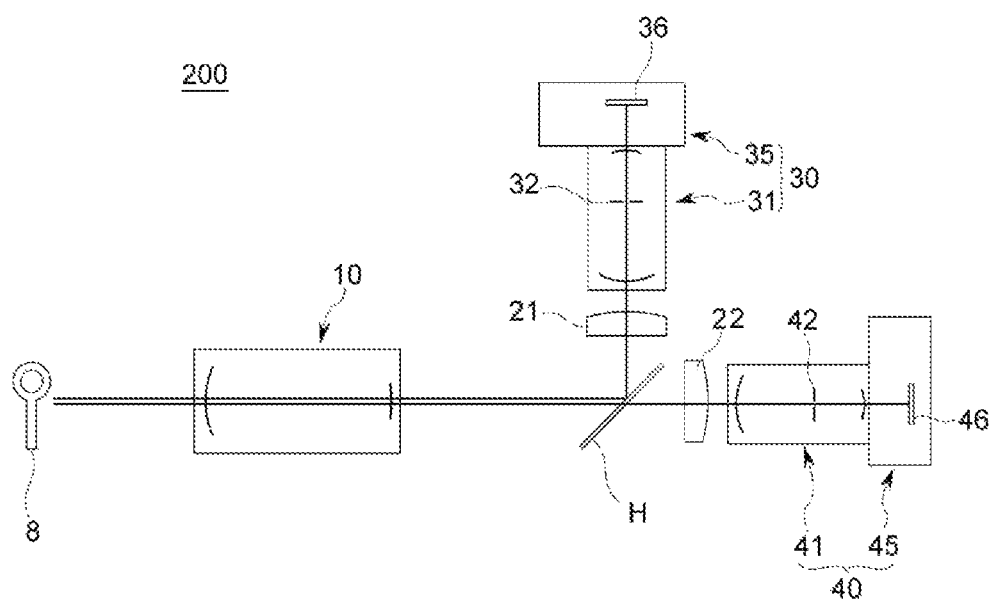

【Fig. 5】
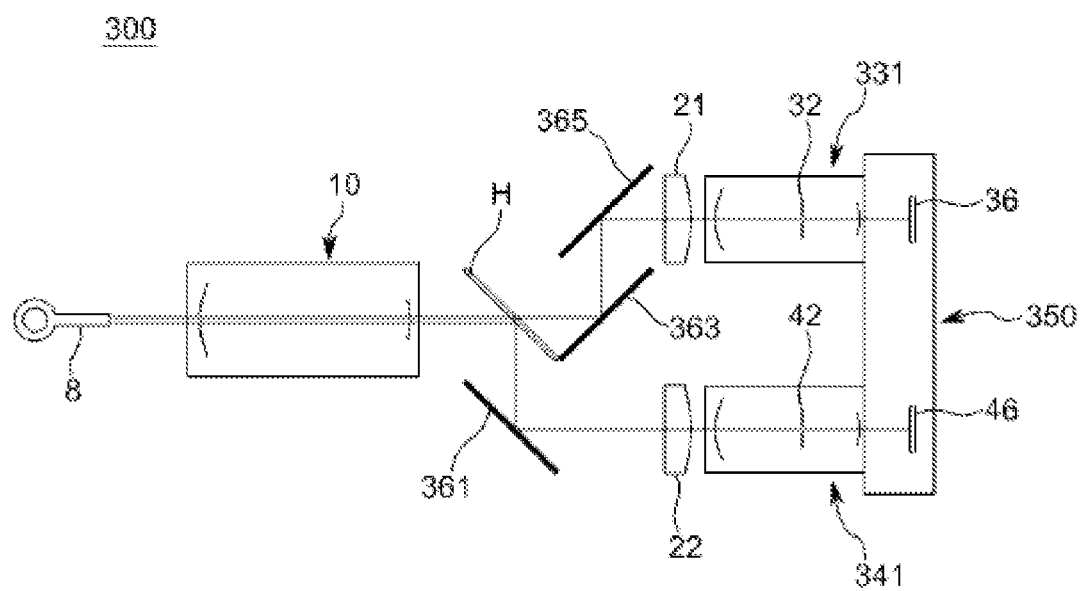

[Fig. 6]
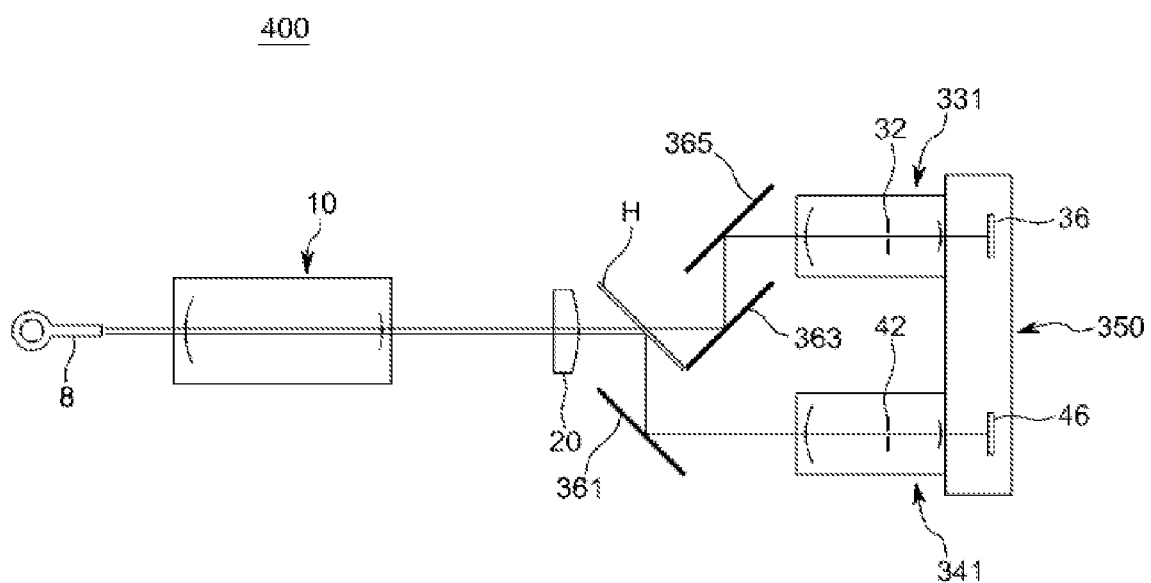

[Fig. 7]
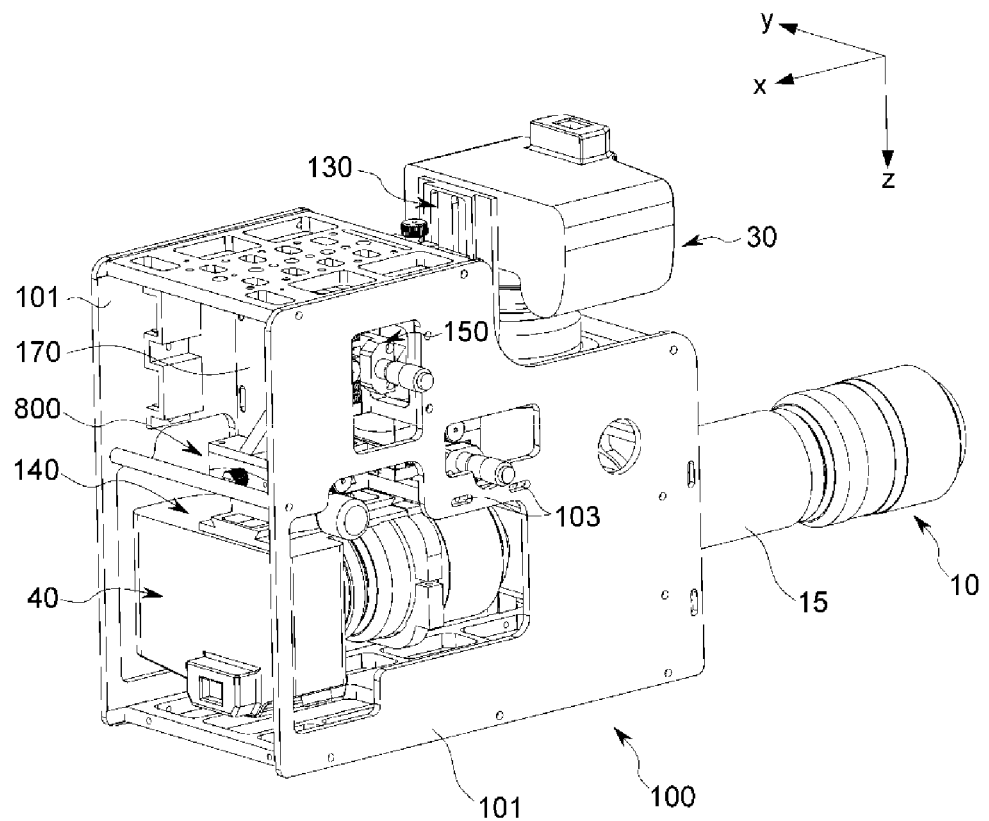

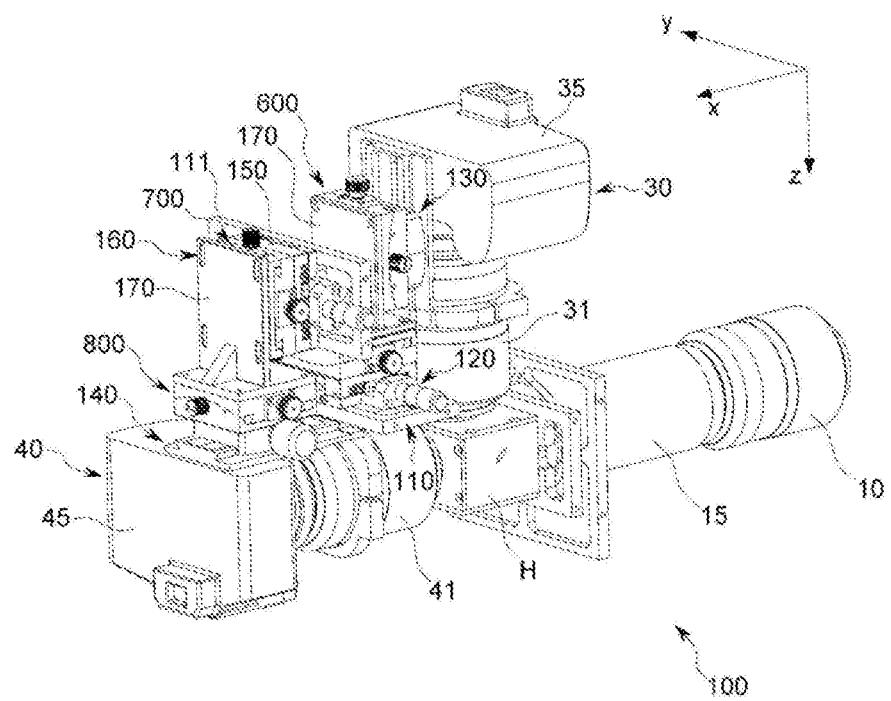
[Fig. 8]

[Fig. 9]
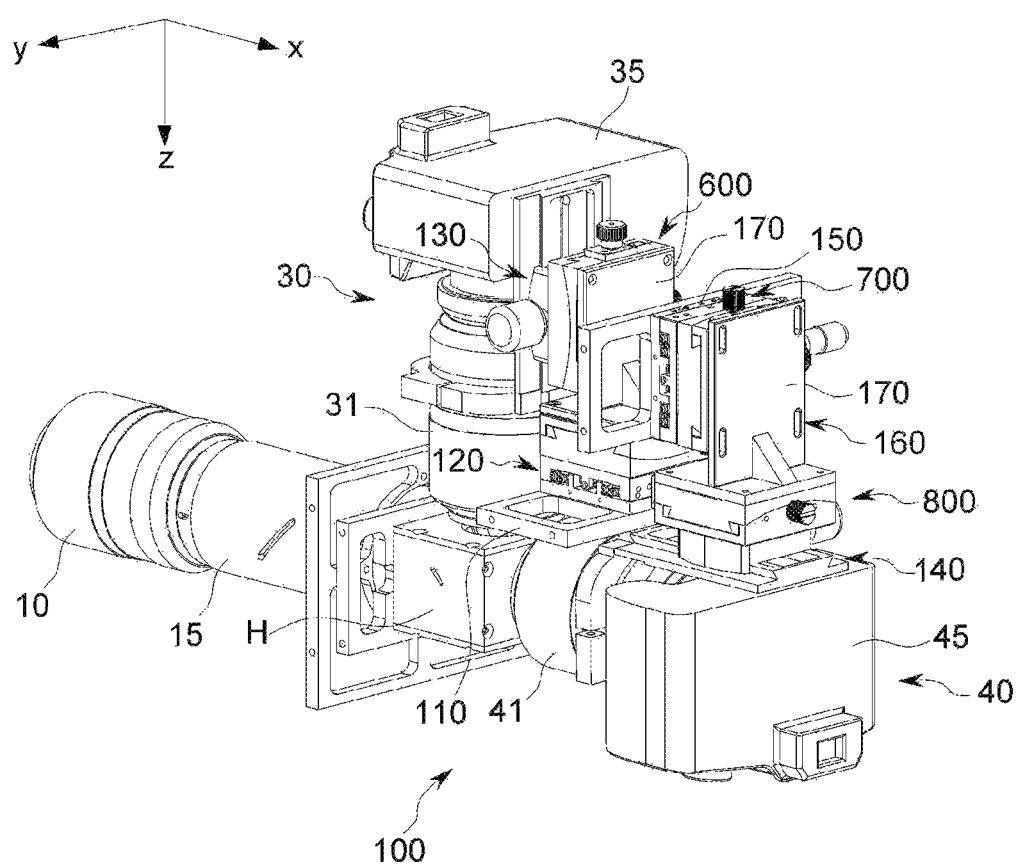

[Fig. 10]
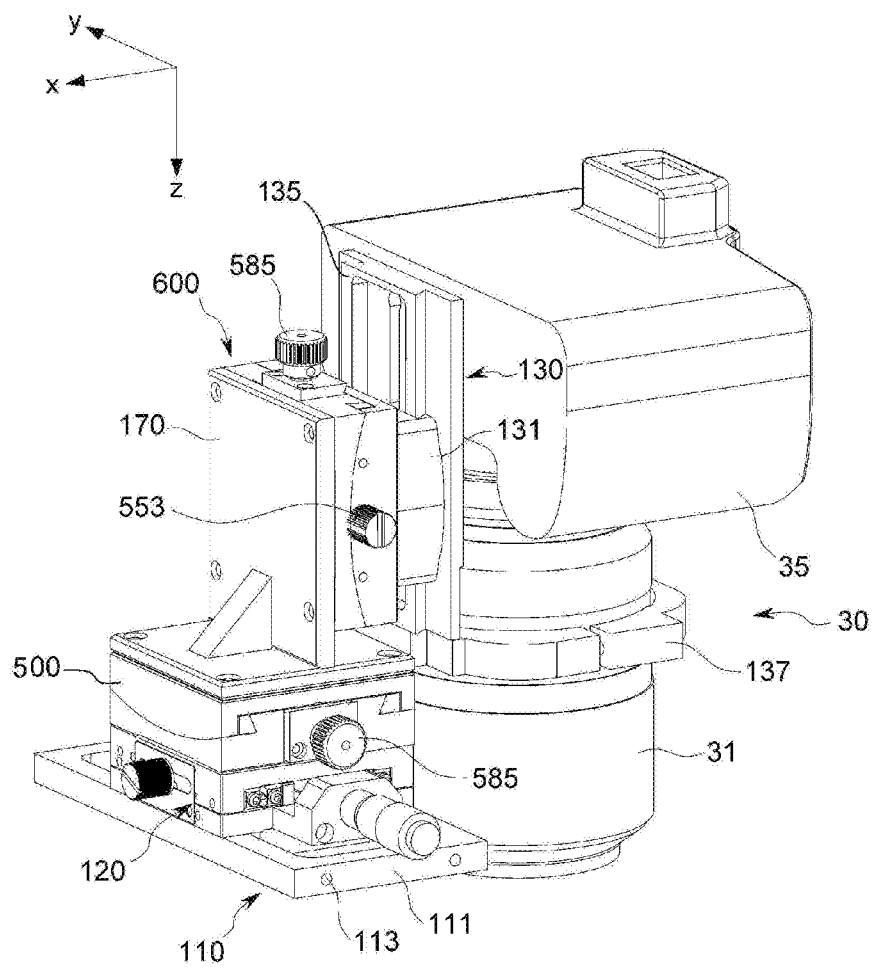

[Fig. 11]
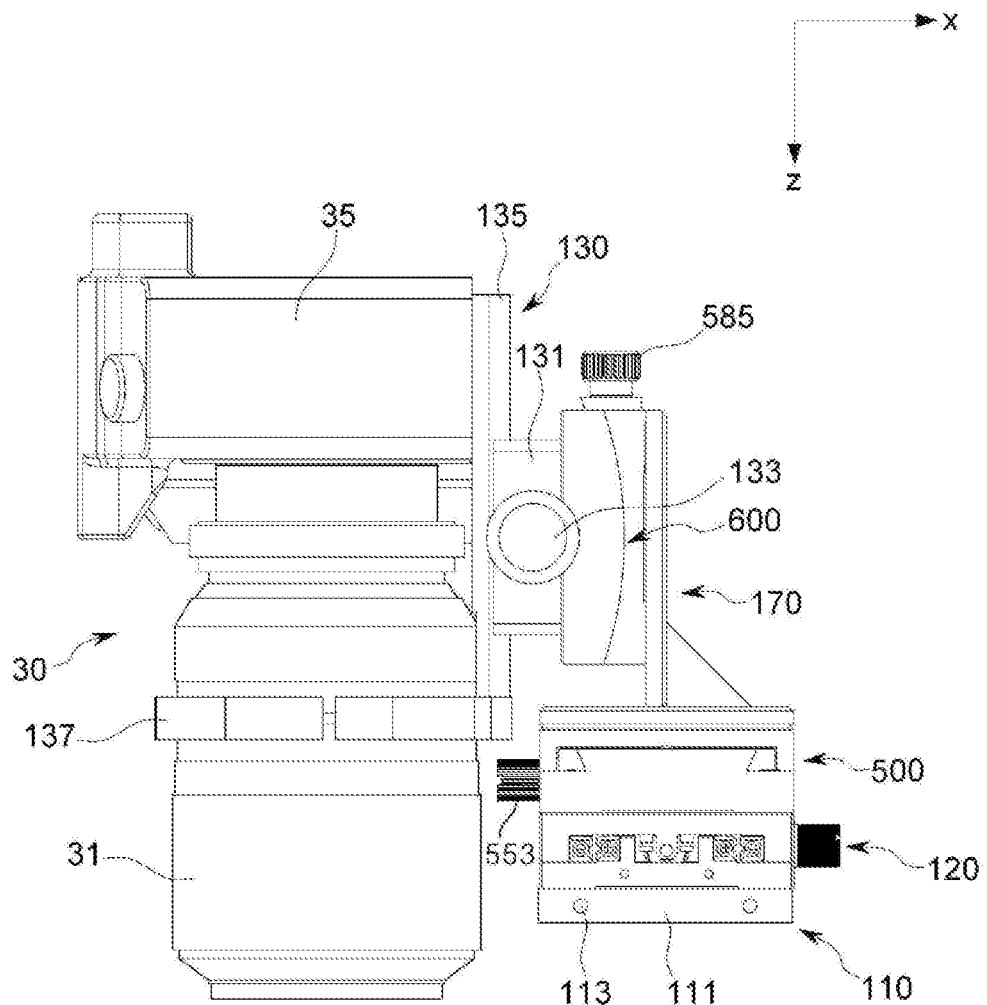

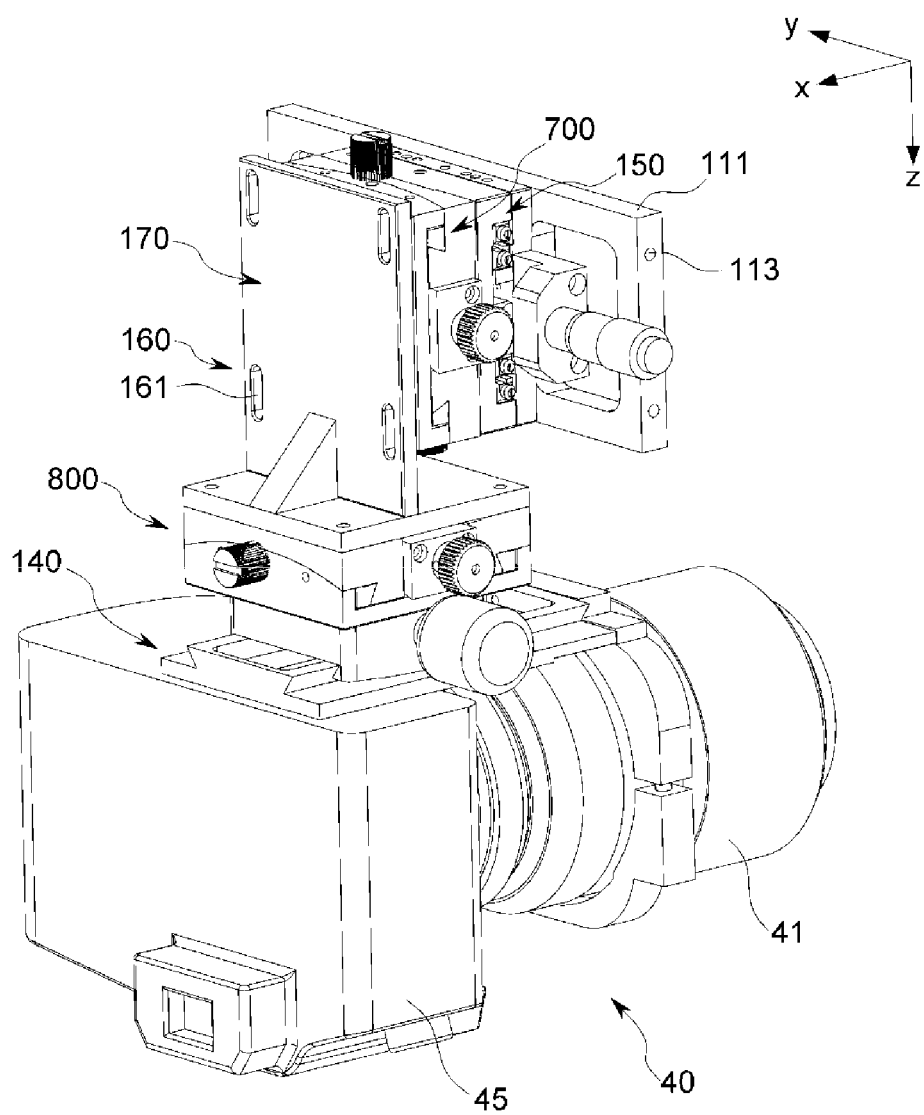
[Fig. 12]

[Fig. 13]
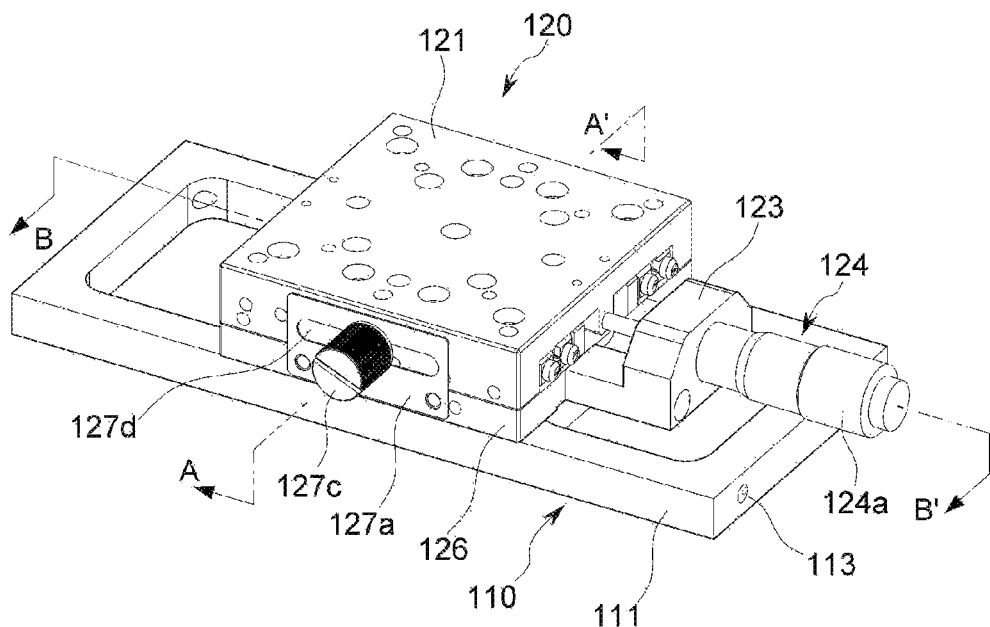
[Fig. 14]
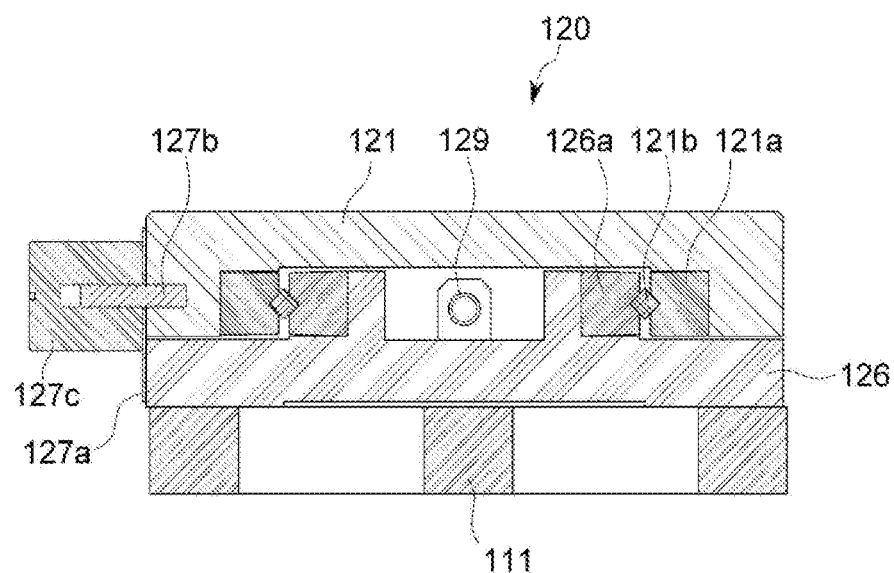

[ Fig. 15 ]
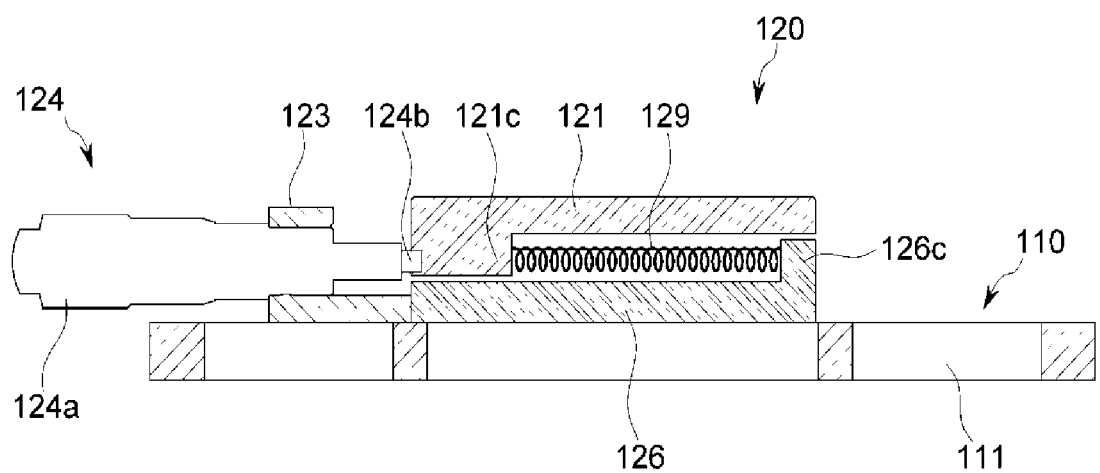

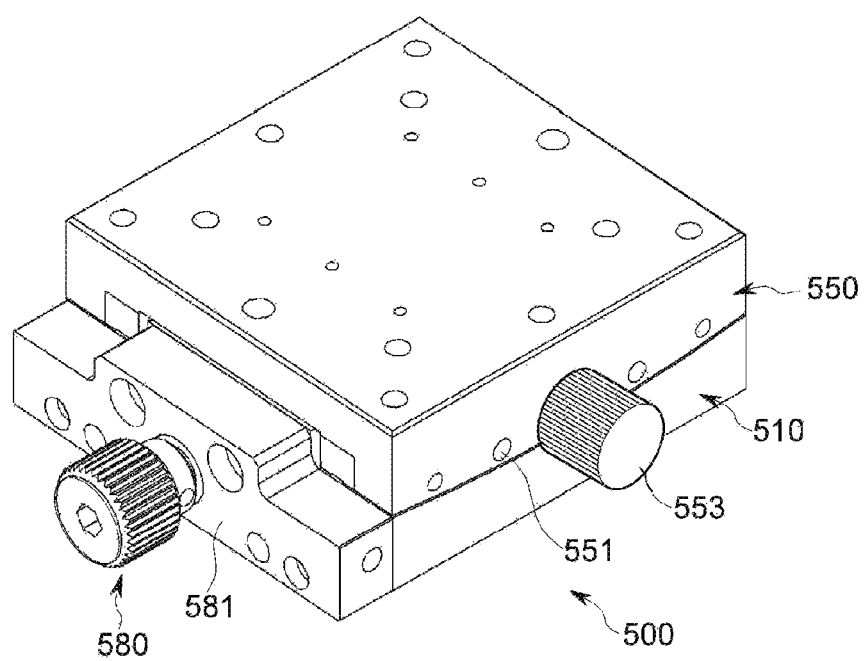
[Fig. 16]

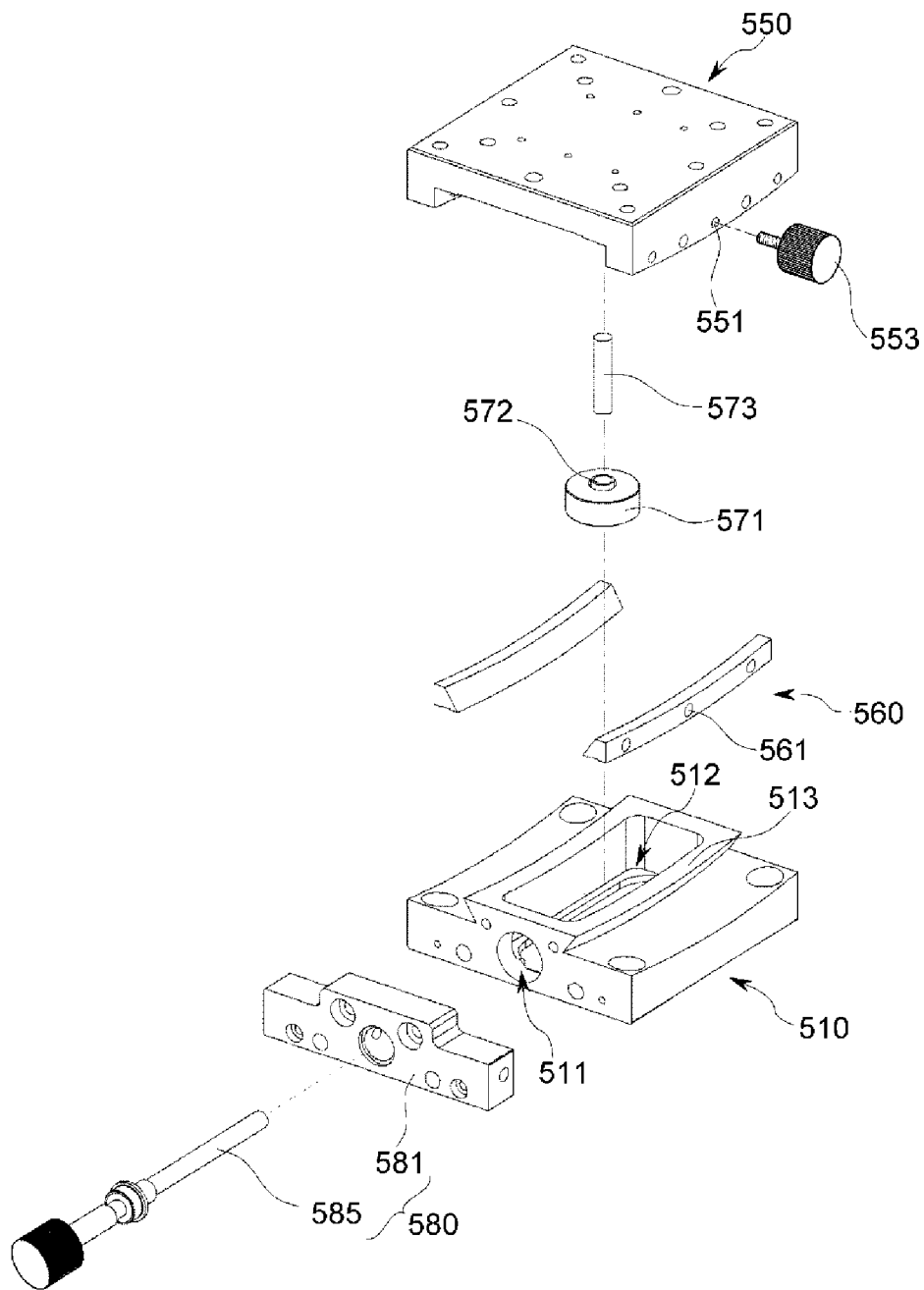
[Fig. 17]

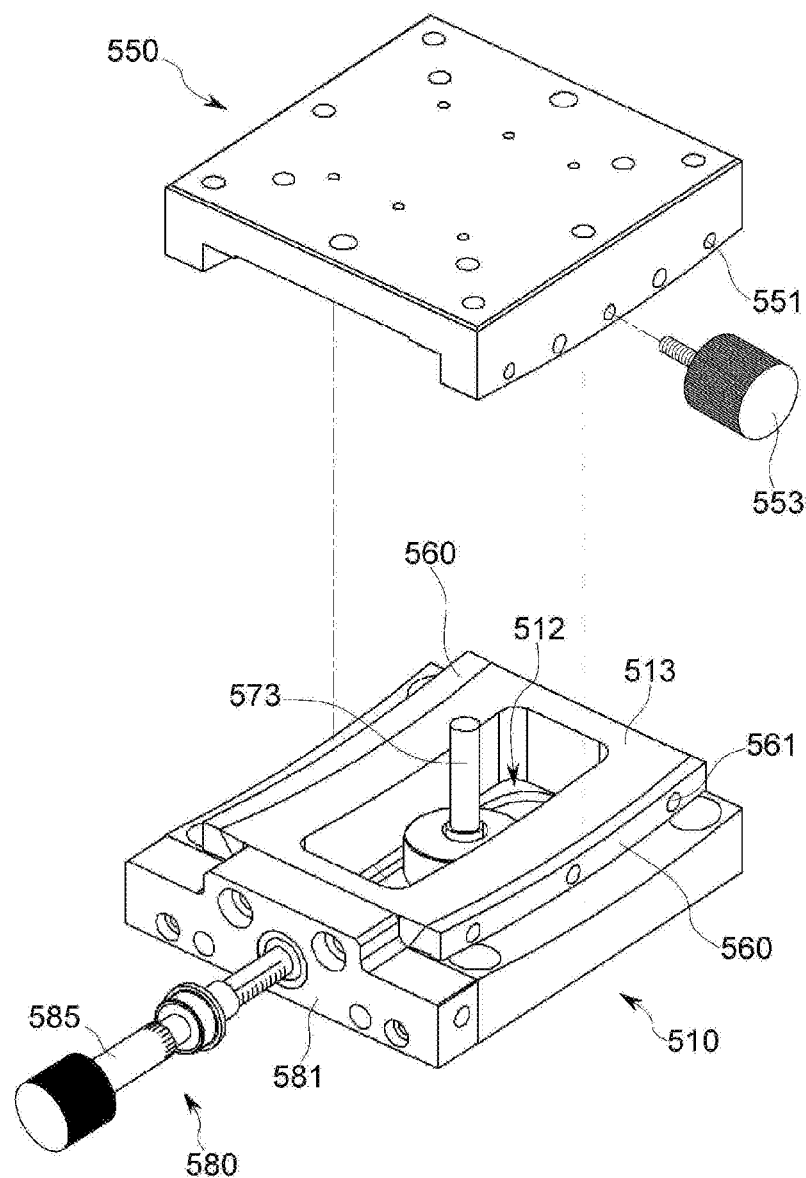
[Fig. 18]

MONOCULAR STEREOSCOPIC CAMERA

CROSS-REFERENCE TO RELATED APPLICATIONS

This application is a 371 of PCT/KR2015/006405, filed Jun. 24, 2015, which claims the benefit of Korean Patent Application Nos. 10-2014-0078731, filed Jun. 26, 2014, the contents of each of which are incorporated herein by reference.

TECHNICAL FIELD

The present invention relates a monocular stereoscopic camera and, more particularly, a monocular stereoscopic camera that can use various first image formation lens assemblies, can reduce a vignetting phenomenon, and can reduce the entire length of a camera by using a macro lens capable of performing proximity expansion shooting for a third image formation lens assembly or by using a telephoto lens having, in combination with a second image formation lens assembly, the characteristics of a macro lens; and that can be easily and simply manipulated and operated with a simple structure by removing adjustment parameters, which are repetitive or replaceable, from parameters related to the adjustment of an optical axis, and by distinguishing a parameter to be adjusted during shooting and an adjustment parameter which may be fixed during shooting after adjustment, from each other.

BACKGROUND ART

A stereoscopic camera, which can simultaneously obtain a left-eye image and a right-eye image from an object using two cameras, generally includes a left-eye camera for obtaining a left-eye image from an object, a right-eye camera for obtaining a right-eye image from an object, and a stereoscopic camera rig for supporting the left-eye camera and the right-eye camera.

The stereoscopic camera rig is largely classified into a parallel type (horizontal type) and a perpendicular type. The parallel type of stereoscopic camera rig supports left-eye camera and a right-eye camera in parallel with each other toward an object such that the left-eye camera and the right-eye camera individually acquire images by receiving light from the object.

According to the perpendicular type of stereoscopic camera rig, as shown in FIG. 1, left-eye and right-eye cameras 4 and 2 are arranged perpendicularly to each other, in which the right-eye camera 2 is disposed on the axis of light reflected from a half mirror H and the left-eye camera 4 is disposed on the axis of light passing through the half mirror H so that the left-eye camera 4 and the right-eye camera 2 can acquire images 3 and 5 by indirectly receiving light from an object 1 through the half mirror H.

In particular, a perpendicular type of stereoscopic camera can be reduced in volume in a plane, as compared with a parallel type of stereoscopic camera, so it is very useful for shooting when a large movement radius of the camera is required, for example, when the camera is mounted on a jimmy jib.

The perpendicular type of stereoscopic camera rig has to be able to strongly fix the cameras 2 and 4 and needs to precisely adjust the position and the angle of the cameras 2 and 4 to adjust the convergence angle and the binocular disparity 'd' between images 3 and 5 acquired by the left-eye camera 4 and the right-eye camera 4; however, the cameras are frequently moved for photographic effect, so it is difficult to adjust the position and the angle of the cameras 2 and 4 during shooting.

A plan for solving this problem has been disclosed in Korean Patent No. 1214855 (titled, "Stereo camera rig having harf-mirror box).

The stereo camera rig holds any one or both of a left-eye camera 4 and a right-eye camera 2 in an adjustment module and adjusts the binocular disparity using the adjustment module. That is, the adjustment module performs both of a function of adjusting the binocular disparity 'd' by straightly moving the cameras therein and a function of adjusting the convergence angle by turning the cameras.

However, it is complicated to adjust the binocular disparity and convergence angle using the adjustment module, so it is difficult to use the adjustment module at an actual shooting site. Further, there is another problem that the structure of the adjustment module is very complicated, so manufacturing is difficult and the manufacturing cost is high.

On the other hand, a first image formation lens 6 may be disposed ahead of the half mirror H in the stereoscopic camera rig. The first image formation lens 6 concentrates light from an object 1 and the first image formation lens 6 should be appropriately selected, depending on the type of the object 1, the distance to the object 2, and the shooting purpose, but the available type of the first image formation lens 6 is limited by the size and position of imaging plates of the cameras 2 and 4, and lenses. Accordingly, it is required to improve the configuration of stereoscopic cameras in order to more extensively select and use the first image formation lens 6 that is the most suitable for shooting.

DISCLOSURE

Technical Problem

The present invention has been made in an effort to solve the problems and an object of the present invention is to provide a monocular stereoscopic camera that can be equipped with a wider variety of lenses that are available for a first image formation lens assembly.

Another object of the present invention is to provide a monocular stereoscopic camera that can easily, quickly, and simply adjust binocular disparity, convergence angle (panning), tilting, rolling, and camera position.

Technical Solution

In order to solve the problems, a monocular stereoscopic camera according to the present invention includes: a first image formation lens assembly 10; a half mirror H reflecting at least a part of light passing through the first image formation lens assembly 10 and transmitting the remaining light; a second image formation lens assembly moving forward focuses of third image formation lens assemblies 31 and 41 in combination with the third image formation lens assemblies, enlarging a virtual image made behind the first image forming lens assembly 10, and reducing a chromatic aberration and a curvature of image field; a first camera 30 including a image formation lens assembly 31 making an image of the light reflected from the half mirror H; and a second camera 40 including the third image formation lens assembly 41 for determining the light passing through the half mirror H. The third image formation lens assemblies 31 and 41 are arranged perpendicularly to each other.

The second image formation lens assembly may be disposed between the first image formation lens assembly 10 and the half mirror H or between the half mirror H and the third image formation lens assemblies 31 and 41.

When the third image formation lens assemblies 31 and 41 are macro lenses capable of performing proximity expansion shooting, the second image formation lens assembly may be selectively provided. That is, when the third image formation lens assemblies 31 and 41 are macro lenses capable of sufficiently enlarging a virtual image behind the first image formation lens assembly without vignetting, the second image formation lens assembly may not be provided.

When the third image formation lens assemblies 31 and 41 are common telephoto lenses, they function as macro lenses in combination with the second image formation lens assembly so that proximity expansion shooting can be performed on an image passing through the first image formation lens assembly. The magnification depends on the size of the virtual image made behind the first image formation lens assembly 10, the sizes of imaging plates 36 and 46 in the cameras 30 and 40, and the length of the entire system (the entire length of a light path from the first image formation lens assembly to the imaging plates).

A monocular stereoscopic camera according to the present invention includes: a first image formation lens assembly 10; a half mirror H reflecting at least a part of light passing through the first image formation lens assembly 10 and transmitting the remaining light; a reflecting mechanism reflecting at least any one of light reflected from the half mirror H or light passing through the half mirror H such that the light reflected from the half mirror H and the light passing through the half mirror H are parallel with each other; a third image formation lens assembly 341 making an image of the light reflected from the half mirror H; a third image formation lens assembly 331 making an image of the light passing through the half mirror H and disposed in parallel with the third image formation lens assembly 341; and a second image formation lens assembly capable of finally enlarging an image made behind the first image formation lens assembly 10 by enlarging an image passing through the first image formation lens assembly 10 and moving forward the focuses of the third image formation lens assemblies.

The second image formation lens assembly may be disposed between the first image formation lens assembly 10 and the half mirror H or between the half mirror H and the third image formation lens assemblies 341 and 331.

When the third image formation lens assemblies 341 and 331 are macro lenses capable of performing proximity expansion shooting, the second image formation lens assembly may be provided or not.

When the third image formation lens assemblies 341 and 331 are common telephoto lenses, the third image formation lens assemblies 341 and 331 may finally enlarge an image passing through the first image formation lens assembly by functioning as macro lenses in combination with the second image formation lens assembly.

Further, the third image formation lens assemblies 341 and 331 may be mounted on the same camera body 350 or camera bodies, respectively.

In the monocular horizontal rig type stereoscopic camera, the first image formation lens assembly 10 and the half mirror H may constitute an adaptor mechanism, the third image formation lens assemblies 331 and 341 and the camera body may constitute a camera unit, and the adaptor mechanism may be separately mounted on the camera unit. Accordingly, it is possible to achieve the present invention by mounting the adaptor mechanism on an existing product (camera unit).

In the present invention, diaphragms 32 and 42 may be provided the third image formation lens assemblies, and a diaphragm may not be provided for the first image formation lens assembly 10. Further, even if a lens with a diaphragm is used for the first image formation lens assembly 10, shooting may be performed with the diaphragm in the first image formation lens assembly 10 open.

A monocular perpendicular rig type of stereoscopic camera according to the present invention may include: a tilting unit 600 rotating the first camera 30 about a y axis; a first panning unit 500 rotating the first camera 30 about an x axis; first, second, and third position adjustment units 110, 120, and 130 capable of selectively moving the first camera 30 straight along the x axis, the y axis, and a z axis to adjust a position of the first camera 30; a second panning unit 700 rotating the second camera 40 about the z axis; a rolling unit 800 rotating the second camera 40 about the x axis; and fourth, fifth, and sixth position adjustment units 140, 150, and 160 capable of selectively moving the second camera 40 along the x axis, the y axis, and the z axis to adjust a position of the second camera 40. For reference, the first image formation lens assembly 10 may be arranged in the x-axial direction, light may travel in the x-axial direction, and the x axis, the y axis, and the z axis may be three axes perpendicular to each other.

That is, the monocular perpendicular rig type of stereoscopic camera does not include a rolling unit rotating the first camera 30 about the z axis and a tilting unit rotating the second camera 40 about the y axis.

The tilting unit 600, the first and second panning units 500 and 700, and the rolling unit 800 may have the same configuration. That is, they may include: a base frame 510 having a top that is a concave curved surface, having an oblong hole 512 formed on the top, and having a guide projection 513 around the oblong hole 512; an upper frame 550 having a bottom that is a convex surface fitted to the curved surface and having bolt holes foiled at a side thereof; sliding rails 560 disposed on the top to be guided to slide by the guide projection 513 and having coupling grooves 561 at a side thereof; a straight-moving unit including a moving block 571 capable of moving straight along the oblong hole 512 inside the oblong hole 512 and having a semispherical groove formed on a top thereof, a hub 572 having a semispherical shape and capable of freely swinging inside the groove, and a connecting pin 573 having a lower end coupled to the hub 572 and an upper end coupled to the upper frame; and an actuating unit 580 disposed on the base frame 510 and straightly moving the moving block 571 by pushing or pulling the moving block 571.

When an adjustment bolt 553 inserted in the bolt hole 551 is inserted into the coupling groove 561 and presses the sliding rails 560, the upper frame 550 may be fixed to the base frame 510, and when the adjustment bolt 553 does not press the sliding rails 560, the upper frame 550 may slide with respect to the base frame 510.

The second and fifth position adjustment units 120 and 150 may selectively move the first and second cameras 30 and 40 along the y axis.

The second and fifth position adjustment units 120 and 150 each may include: a lower block 126; an upper block 121 slidably disposed on the lower block 126; an elastic member 129 connecting the lower block 126 and the upper block 121 to each other; a moving member moving the upper block 121 by pushing the upper block 121; and a fixing member fixing the upper block 121 with respect to the lower block 126.

The moving member may slide the upper block 121 against elasticity of the elastic member 129 and may fix the upper block 121 to the lower block 126 using the fixing member after the sliding.

Advantageous Effects

The monocular stereoscopic camera according to the present invention has the following effects.

First, it is possible to select lenses available for the first image formation lens assembly in a wide range.

Second, it is possible to easily, quickly, and simply adjust binocular disparity, a convergence angle (panning), tilting, rolling, and a camera position.

DESCRIPTION OF DRAWINGS

FIG. 1 is a view showing the configuration of a perpendicular type of stereoscopic camera rig.

FIG. 2 is a view showing the configuration of a stereoscopic camera according to a first embodiment of the present invention.

FIGS. 3a to 3c are views showing the role of a second image formation lens of the present invention.

FIG. 4 is a view showing the configuration of a stereoscopic camera according to a second embodiment of the present invention.

FIG. 5 is a view showing the configuration of a stereoscopic camera according to a third embodiment of the present invention.

FIG. 6 is a view showing the configuration of a stereoscopic camera according to a fourth embodiment of the present invention.

FIG. 7 is a perspective view showing the stereoscopic camera according to the first embodiment of the present invention.

FIGS. 8 and 9 are perspective views showing the internal structure of the stereoscopic camera shown in FIG. 6.

FIG. 10 is a perspective view showing a first camera, a tilting unit, a first panning unit, and a first position adjustment unit in the stereoscopic camera shown in FIG. 7.

FIG. 11 is a rear view of FIG. 10.

FIG. 12 is a perspective view showing a second camera, a second panning unit, and a second position adjustment unit in the stereoscopic camera shown in FIG. 7.

FIG. 13 is a perspective view showing a base plate for the first and second cameras and a position adjustment unit for adjusting a position in a y direction.

FIG. 14 is a cross-sectional view taken along line A-A' shown in FIG. 13.

FIG. 15 is a cross-sectional view taken along line B-B' of FIG. 13.

FIG. 16 is a perspective view showing the first panning unit in the stereoscopic camera shown in FIG. 7.

FIGS. 17 and 18 are exploded perspective views showing the first panning unit shown in FIG. 16.

BEST MODE

Figure 19A:
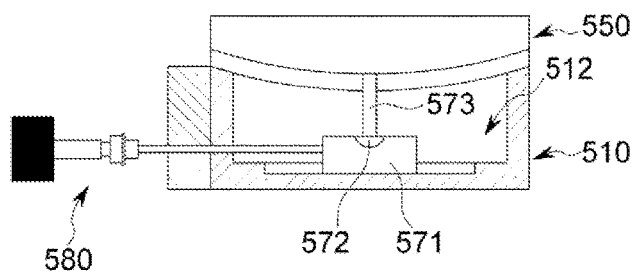
FIG. 19 is a cross-sectional view showing the operation of the first panning unit shown in FIG. 17.

Hereinafter, the present invention will be described in detail with reference to the accompanying drawings. The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention. Therefore, the configurations described in the embodiments and drawings of the present invention are merely embodiments but do not represent all of the technical spirit of the present invention. Thus, the present invention should be construed as including all the changes, equivalents, and substitutions included in the spirit and scope of the present invention at the time of filing this application.

As described above the objects and effects of the present invention are to increase the selective range of lenses available for a first image formation lens and to easily, quickly, and simply adjust binocular disparity, convergence angle (panning), tilting, rolling, and camera position. Configurations for the two objects and effects will be sequentially described below. Further, the term '~~ image formation lens assembly' stated herein may be one lens, but may also be composed of two or more lenses.

1. Configuration for Increasing Selective Range of Lenses Available for First Image Formation Lens (1) First Embodiment FIG. 2 is a view showing the configuration of a stereoscopic camera according to a first embodiment of the present invention.

Referring to the figure, a stereoscopic camera 100 is a monocular perpendicular rig, in which a first camera 30 and a second camera 40 are arranged perpendicularly to each other. In detail, the stereoscopic camera 100 includes a first image formation lens assembly 10, a second image formation lens assembly 20 disposed behind the first image formation lens assembly 10, a half mirror H, a first camera 30 disposed on the axis of light reflected from the half mirror H, and a second camera 40 disposed on the axis of light passing through the half mirror H.

The first image formation lens assembly 10 concentrates light from an object 8. The first image formation lens assembly 10 is replaceable and is equipped with an appropriate lens that is selected in consideration of the object of shooting, the type of object, and the distance to the object etc.

The second image formation lens assembly 20 approximates focuses and reduces chromatic aberration and curvature of image field in combination with third image formation lens assemblies 31 and 41. Further, the second image formation lens assembly 20 may perform assistant focus adjustment on an optical axis connecting the half mirror H and the first image formation lens assembly 10 to be movable forward and backward so that a focus can be adjusted to an object out of the focus range of the first image formation lens assembly 10 in shooting. When a main object is positioned out of, but close to the focus adjustment range of the first image formation lens assembly 10, it is possible to adjust the focus to the close object by moving the second image formation lens assembly 20 toward the third image formation lens assemblies 31 and 41. Further, when a main object is positioned far from the focus adjustment range of the first image formation lens assembly 10, it is possible to adjust the focus to the object positioned out of and far from the focus range by moving the second image formation lens assembly 20 toward the first image formation lens assembly 10.

The first camera 30 includes the third image formation lens assembly 31 and a camera body 35. Further, the second camera 40 includes the third image formation lens assembly 41 and a camera body 45. Imaging plates 36 and 46 are disposed in the camera bodies 35 and 45, respectively.

The third image formation lens assembly 31 makes an image of light reflected from the half mirror H and the third image formation lens assembly 41 makes an image of light passing through the half mirror H.

Macro lenses that can perform proximity expansion shooting may be used as base lenses for the third image formation lens assemblies 31 and 41. When a sufficient magnification is ensured by using a macro lens for the third image formation lens assemblies 31 and 41, the second image formation lens assembly 20 may be removed.

When telephoto lens is used for the third image formation lens assemblies 31 and 41, the third image formation lens assemblies 31 and 41 function as a macro lens in combination with the second image formation lens assembly 20.

In order to use various lenses for the first image formation lens assembly 10, it is possible to enlarge a virtual image made behind the first image formation lens assembly 10 using the second image formation lens assembly 20 and the third image formation lens assemblies 31 and 41.

To this end, when it is limited to adjust the distance between the imaging plate 36 and the third image formation lens assembly 31 and the distance between the imaging plate 36 and the third image formation lens assembly 41, it is possible to enlarge and take an image made by the first image formation lens assembly 10 by using telephoto lenses for the third image formation lens assemblies 31 and 41 together with the second image formation lens assembly 20 so that close-up shooting is possible. Alternatively, it is possible to finally enlarge and take a virtual image made behind the first image formation lens assembly 10 by using macro-type lenses (a lens capable of performing proximity expansion shooting) for the third image formation lens assemblies 31 and 41 and additionally using the second image formation lens assembly 20 in order to further approximate focuses and by giving a function of correcting a chromatic aberration and a curvature of image field to the second image formation lens assembly 20.

In particular, when the sizes of the camera imaging plates 36 and 46 are larger than the size of an image 9 on a first virtual focus surface made by the first image formation lens assembly 10, it is possible to reduce vignetting and increase the selective range of the first image formation lens assembly 10 by using macro lenses that can perform proximity expansion shooting as the third image formation lens assemblies 31 and 41.

Further, by using macro lenses that can perform proximity expansion shooting as the third image formation lens assemblies 31 and 41, it is possible to reduce the size of the entire system from the first image formation lens assembly 10 to the camera imaging plates 36 and 46, as compared with using telephoto lenses.

On the other hand, although it may be possible to use a lens having a higher magnification (a lens with a short focal distance) for the second image formation lens assembly 20 in order to achieve the effect described above, a result with less distortion and high quality can be achieved by using lenses that can perform proximity expansion shooting for the third image formation lens assemblies 31 and 41 rather than increasing the magnification of the second image formation lens assembly 20.

On the other hand, according to the present invention, diaphragms 32 and 42 may be provided the third image formation lens assemblies 31 and 41, respectively, and a diaphragm may not be provided for the first image formation lens assembly 10. Further, even if a lens with a diaphragm is used for the first image formation lens assembly 10, shooting is performed with the diaphragm in the first image formation lens assembly 10 open. This configuration has an effect of preventing vignetting.

Meanwhile, as described above, when a sufficient magnification is ensured by using macro lenses for the third image formation lens assemblies 31 and 41, it may be possible to remove the second image formation lens assembly 20, or when telephoto lenses are used for the third image formation lens assemblies 31 and 41, the third image formation lens assemblies 31 and 41 and the second image formation lens assembly 20 function as a macro lens in combination with each other, and the function of the second image formation lens assembly 20 relating to this configuration is described hereafter with reference to FIGS. 3a to 3c.

Although the half mirror H and the first camera 30 are not shown in FIGS. 3a to 3c, it may be used to understand the difference between the cases when the second image formation lens assembly 20 is installed and is not installed.

FIG. 3a shows the case when the second image formation lens assembly 20 is installed and FIG. 3b shows the case when the second image formation lens assembly 20 is not installed. The second image formation lens assembly 20 moves forward the focus of the third image formation lens assembly 41, that is, moves the focus of the third image formation lens assembly 41 to the right in the figures, so the length of the entire system (from the first image formation lens assembly 10 to the imaging plate 46) can be reduced (the position of the first image formation lens assembly can be moved to the right.

In detail, the focus of the third image formation lens assembly 41 should be at the virtual image (9) made by the first image formation lens assembly 10, so it is possible to move forward the focus of the third image formation lens assembly 41 by also using the second image formation lens assembly 20 when using a lens manufactured to be able to perform proximity expansion shooting (for example, a macro lens) for the third image formation lens assembly 41 or when using a common telephoto lens (a lens having a common focus adjustment position value).

If a normal image is obtained in the case shown in FIG. 3a, a normal image is not obtained in the case shown in FIG. 3b because the position of the focus of the third image formation lens assembly 41 and the position of the virtual image 9 made by the first image formation lens assembly 10 do not agree. In this case, it is required to move the first image formation lens assembly 10 farther away from the third image formation lens assembly 41, but vignetting occurs in this case.

(2) Second Embodiment

FIG. 4 is a view showing the configuration of a stereoscopic camera according to a second embodiment of the present invention. Reference numerals of the reference numeral in FIG. 4 indicate the same components indicated by the same reference numerals in FIGS. 2 to 3c.

Referring to the figure, a stereoscopic camera 200 is a monocular perpendicular rig, in which a first camera 30 and a second camera 40 are arranged perpendicularly to each other. In detail, the stereoscopic camera 200 includes a first image formation lens assembly 10, second image formation lens assemblies 21 and 22 disposed behind the first image formation lens assembly 10, a half mirror H, a first camera 30 disposed on the axis of light reflected from the half mirror H, and a second camera 40 disposed on the axis of light passing through the half mirror H.

Compared with the stereoscopic camera 100, the stereoscopic camera 200 is the same as the stereoscopic camera 100 except that the second image formation lens assemblies 21 and 22 are disposed behind the half mirror H. Accordingly, the light reflected from the half mirror H travels into the third image formation lens assembly 31 through the second image formation lens assembly 21, while the light passing through the half mirror H travels into the third image formation lens assembly 41 through the second image formation lens assembly 22.

Further, the stereoscopic camera 200 is the same as the stereoscopic camera 100 in that macro lenses or telephoto lenses can be used for the third image formation lens assemblies 31 and 41, the second image formation lens assemblies 21 and 22 can be removed when macro lenses are used for the third image formation lens assemblies 31 and 41, and the focus is approximated by combination of the third image formation lens assemblies 31 and 41 and the second image formation lens assemblies 21 and 22 when telephoto lenses are used for the third image formation lens assemblies 31 and 41.

However, the stereoscopic camera 200, unlike the stereoscopic camera 100, may not be equipped with a device for moving the second image formation lens assemblies 21 and 22 forward on an optical axis, and this is because a loss of time required to individually adjust the focuses of a left-eye lens and a right-eye lens is larger than an advantage obtained by ensuring expansion of a focus range is available at any time by moving the second image formation lens assemblies 21 and 22.

(3) Third Embodiment

FIG. 5 is a view showing the configuration of a stereoscopic camera according to a third embodiment of the present invention. Reference numerals of the reference numeral in FIG. 5 indicate the same components indicated by the same reference numerals in FIGS. 2 to 4.

Referring to the figure, a stereoscopic camera 300, which is a monocular horizontal rig, includes an adaptor mechanism and a camera unit.

The adaptor mechanism includes a first image formation lens assembly 10, a half mirror H disposed behind the first image formation lens assembly 10, a reflecting mechanism, and second image formation lens assemblies 21 and 22.

The reflecting mechanism reflects any one of light reflected from the half mirror H and light passing through the half mirror H so that the light reflected from the half mirror H and the light passing through the half mirror H are parallel with each other.

FIG. 5 shows an example of the reflecting mechanism, in which the reflecting mechanism may include mirrors 363 and 365 that reflect the light passing through the half mirror H to a third image formation lens assembly 331 and a mirror 361 that reflects the light reflected from the half mirror H to a third image formation lens assembly 341.

Accordingly, some of the light passing through the first image formation lens assembly 10 is reflected from the mirrors 363 and 365 and then travels into the second image formation lens assembly 21 after passing through the half mirror H and the remaining light passing through the first image formation lens assembly 10 is sequentially reflected from the half mirror H and the mirror 361 and then travels into the second image formation lens assembly 22.

The camera unit includes the third image formation lens assemblies 331 and 341 and a camera body 350. The light passing through the second image formation lens assembly 21 travels into the third image formation lens assembly 331, while the light passing through the second image formation lens assembly 22 travels into the third image formation lens assembly 341.

The stereoscopic camera 300 is the same as the stereoscopic cameras 100 and 200 in that macro lenses or telephoto lenses can be used for the third image formation lens assemblies 331 and 341, the second image formation lens assemblies 21 and 22 can be removed when macro lenses are used for the third image formation lens assemblies 331 and 341, and the focus is approximated by combination of the third image formation lens assemblies 331 and 341 and the second image formation lens assemblies 21 and 22 when telephoto lenses are used for the third image formation lens assemblies 331 and 341.

Meanwhile, the camera unit is an integrated binocular type in the figure, but it may be composed of two cameras, which will be apparent to those skilled in the art.

The camera unit may be a binocular stereoscopic camera (that is, may be an integrated binocular stereoscopic camera or may be composed of two cameras) or a horizontal rig. The adaptor mechanism may be separately mounted on the camera unit. Accordingly, this embodiment may be achieved by separately mounting the adaptor mechanism on a binocular stereoscopic camera or a horizontal rig that is an existing stereoscopic camera. The configuration of separably mounting the adaptor mechanism on the camera unit is well known in the art and can be easily implemented by those skilled in the art, so it is not described herein.

(4) Fourth Embodiment

FIG. 6 is a view showing the configuration of a stereoscopic camera according to a fourth embodiment of the present invention. Reference numerals of the reference numeral in FIG. 6 indicate the same components indicated by the same reference numerals in FIGS. 2 to 5.

Referring to the figure, a stereoscopic camera 400 includes an adaptor mechanism and a camera unit. Compared with the stereoscopic camera 300, the stereoscopic camera 400 is the same as the stereoscopic camera 300 except that the second image formation lens assembly 20 is disposed ahead of the half mirror H. Accordingly, some of the light passing through the first image formation lens assembly 10 is reflected from the half mirror H and the mirror 361 and then travels into the third image formation lens assembly 341, while the remaining light passing through the first image formation lens assembly 10 is reflected from the mirrors 363 and 365 and then travels into the third image formation lens assembly 331 after passing through the half mirror H.

Further, the stereoscopic camera 400 is the same as the stereoscopic camera 300 in that macro lenses or telephoto lenses can be used for the third image formation lens assemblies 331 and 341, the second image formation lens assembly 20 can be removed when macro lenses are used for the third image formation lens assemblies 331 and 341, and the focus is approximated by combination of the third image formation lens assemblies 331 and 341 and the second image formation lens assembly 20 when telephoto lenses are used for the third image formation lens assemblies 331 and 341.

Similar to the third embodiment, the camera unit may be a binocular stereoscopic camera (that is, may be an integrated binocular stereoscopic camera or may be composed of two cameras) or a horizontal rig. The adaptor mechanism may be separably mounted on the camera unit. Accordingly, this embodiment may be achieved by separately mounting the adaptor mechanism on a binocular stereoscopic camera or a horizontal rig that is an existing stereoscopic camera.

2. Configuration for Easily, Quickly, and Simply Adjusting Binocular Disparity, Convergence Angle (Panning), Tilting, Rolling, and Camera Position (1) Parts of which the Optical Axis is Adjusted in a Monocular Perpendicular Rig Type of Stereoscopic Camera.

In order to take a stereoscopic image using the monocular perpendicular rig type of stereoscopic camera shown in FIG. 1, unlike a binocular horizontal type and a binocular perpendicular type, it is required to adjust the optical axes of the left-eye and right-eye cameras 4 and 2, the half mirror H, and the main barrel (not shown in FIG. 1), which is described hereafter.

① Left-eye camera (4): The left-eye camera (4) has to have an optical axis that should be able to be moved left and right (in a y direction), forward and backward (in an x direction) to adjust the size of an image, and up and down (in a z direction). Further, the optical axis of the left-eye camera (4) should be able to be panned left and right (rotated (turned) about a z axis, tilted up and down (rotated (turned) about a y axis, and adjusted in rolling (rotating (turning) about an x axis) in preparation for a case when horizontality of the left-eye and right-eye cameras 4 and 2 is different. Further, the focus of the left-eye camera 4 should adjustable.

② Right-eye camera (2): The right-eye camera (4), similar to the left-eye camera 4, has to have an optical axis that should be able to be moved left and right, forward and backward to adjust the size of an image, and up and down. Further, the optical axis of the right-eye camera (2) should be able to be panned left and right (rotated (turned) about the x axis, tilted up and down (rotated (turned) about the y axis), and adjusted in rolling (rotating (turning) about the z axis) in preparation for a case when horizontality of the left-eye and right-eye cameras 4 and 2 is different.

③ Half mirror H: The half mirror has to transmit at least a part of the light and reflect the remaining light at a right angle, so it should be installed accurately at 45° with respect to an optic axis, but it is difficult to accurately fit the angle and the position due to physical production errors, so the angle should be adjustable. Accordingly, the half mirror H should be able to be tilted to adjust the angle, and since the horizontality of images made by the left-eye and right-eye cameras 4 and 2 may be different, the half mirror H may be rolled or an error due to a thickness error of the half mirror H may be generated, and accordingly, the half mirror H should be able to be moved forward and backward.

④ Main barrel: The main barrel is an adjustment parameter that only a monocular type can have, the position of the first image formation lens assembly 6 should be able to be moved forward and backward, and the barrel should be able to be moved up and down (in the z-axial direction) and left and right (in the y-axial direction). Further, the main barrel should be able to be panned left and right and tilted up and down, and the focus should be adjustable.

These functions are abbreviated in the following Table 1. Table 1 shows parameters that should be adjusted when taking stereoscopic images using a binocular perpendicular rig type of stereoscopic camera.

TABLE 1

| | Left-eye camera | Right-eye camera | Half mirror | Barrel |
|---|---|---|---|---|
| Optical axis adjustment parameters | Moving forward and backward Moving | Moving forward and backward Moving | Moving forward and backward Horizontal | Moving forward and backward Moving |
| | left and right Moving up and down Panning left and right Tilting up and down Horizontal rolling Focus | left and right Moving up and down Panning left and right Tilting up and down Horizontal rolling Focus | rolling Tilting up and down | up and down Moving left and right Panning left and right Tilting up and down Focus |

As shown in Table 1, when a perpendicular rig is manufactured such that all adjustment parameters can be adjusted, the possibility of n optical adjustment failure occurring is higher, because the number of cases that may occur in the parameters is large. The parameters may have two values of positive and negative values, so the number of all the cases is, $2^n=2^{23}=8,388,608$ so, 8,388,608 is obtained, but the parameters may actually have zero in addition to positive and negative values, so the number of cases of $3^{23}$ may be obtained.

It is substantially impossible to cope with all of cases within a short time at a shooting site. Accordingly, the applicant(s) realized a strong need of developing a technology that can efficiently adjust the optical axis of a monocular perpendicular rig type of stereoscopic camera, and found out from extensive research that it is possible to efficiently adjust an optical axis by removing adjustment parameters that are repetitive or replaceable from the adjustment parameters described above, and consequently, achieved the present invention.

(2) Analysis of Repetitive and Replaceable Parameters

① Left-eye camera

ⓐ Moving forward and backward (in the x direction): An adjustment device for moving the left-eye camera 4 forward and backward adjusts left and right images to fit the sizes, so it is necessary and not replaceable. However, when it is required to reduce the weight of the entire camera, the device may be mounted on only any one of the left-eye camera 4 and the right-eye camera 2.

ⓑ Moving left and right (in the y direction): Moving a camera left and right is necessary because the binocular disparity should be adjusted, and should be performed at any time during shooting. This function is applied to only any one of the left-eye and right-eye cameras in a binocular perpendicular type in some cases, but it should be applied to both cameras 4 and 2 in a monocular perpendicular type.

ⓒ Moving up and down (in the z direction): This is necessary for the characteristics of a monocular perpendicular rig, but is not necessary during shooting once the camera is fixed.

ⓓ Panning left and right (rotating about the z axis): This is necessary for adjusting a convergent point (adjusting a convergence angle). This is necessary for both of the left-eye and right-eye cameras 4 and 2.

ⓔ Tilting up and down (rotating about the y axis): This is necessary for at least one of the left-eye and right-eye cameras 4 and 2, and when this is applied to the camera 2 receiving the light reflected from the half mirror H, it can be used for compensating for an error in an installation angle of the half mirror H, so it may be possible to remove a device for adjusting tilting of the half mirror H by applying this function to the camera (right-eye camera 2) that receives reflected light. In this case, it is important to install the camera such that the camera can be moved forward and backward in the same direction as the main optical axis (x axis in the position values of the camera.

(f) Rolling (rotating about the x axis): Rolling, which is performed to adjust the left and right images at the same level, may be applied to any one of the left-eye and right-eye cameras 4 and 2 or to the half mirror H to adjust the left and right images. A device for adjusting rolling is mounted on the left-eye and right-eye cameras 4 and 2, the rolling function of the half mirror H can be removed.

(g) Focus: A function of adjusting the focus of the base lens (third image formation lens assembly of the left-eye and right-eye cameras 4 and 2 is necessary. However, only the focus of the main lens (first image formation lens assembly) can be adjusted without frequently adjusting the focus during shooting.

(2) Right-eye camera (a) Moving forward and backward (in the z-axial direction): An adjustment device for moving the right-eye camera 2 forward and backward adjusts left and right images to fit the sizes, so it is necessary and not replaceable. However, when it is required to reduce the weight of the entire camera, the device may be mounted on only any one of the left-eye camera 4 and the right-eye camera 2.

(b) Moving left and right (in the y-axial direction): Moving a camera left and right is necessary because the binocular disparity should be adjusted, and should be performed at any time during shooting. This function is applied to only any one of the left-eye and right-eye cameras in a binocular perpendicular type in some cases, but it should be applied to both cameras 4 and 2 in a monocular perpendicular type.

(c) Moving up and down (in the x-axial direction): This is necessary for the characteristics of a monocular perpendicular rig, but is not necessary during shooting once the camera is fixed.

(d) Panning left and right (rotating about the x axis): This is necessary for adjusting a convergent point. This is necessary for both of the left-eye and right-eye cameras 4 and 2 and should be adjustable at any time during shooting.

(e) Tilting up and down (rotating about the y axis): This is necessary for at least one of the left-eye and right-eye cameras 4 and 2, and when this is applied to the camera 2 receiving the light reflected from the half mirror H, it can be used for compensating for an error in an installation angle of the mirror, so it may be possible to remove a device for adjusting tilting of the half mirror H by applying this function to the camera (right-eye camera 2) that receives reflected light. In this case, it is important to install the camera such that the camera can be moved forward and backward in the same direction as the main optical axis (x axis in the position values of the camera.

(f) Rolling (rotating about the z axis): Rolling, which is performed to adjust the left and right images at the same level and it is important to apply this function to any one of the left-eye and right-eye cameras 4 and 2 or to the half mirror H in order to adjust the left and right images. A device for adjusting rolling is mounted on the left-eye camera 4 or the right-eye camera 2, thus the rolling function of the half mirror H can be removed.

(g) Focus: A function of adjusting the focus of the base lens (third image formation lens assembly of the left-eye and right-eye cameras 4 and 2 is necessary. However, only the focus of the main lens (first image formation lens assembly) can be adjusted without frequently adjusting the focus during shooting.

(3) Half mirror (a) Moving forward and backward (in the x-axial direction): An adjustment device for moving the half mirror H forward and backward is necessary, but when the camera (right-eye camera 2) that receives reflected light is given a tilting function and the camera can be moved within the optical axial direction (in the x-axial direction), the adjustment device for moving the half mirror H forward and backward can be removed. It is not necessary to move the camera, once the camera is moved.

(b) Rolling (rotating about the x axis): Although it is possible to fit the horizontality of left and right images using the rolling function of the half mirror H, a device for adjusting rolling of the half mirror H can be removed when a device for adjusting rolling is mounted on a camera.

(c) Tilting up and down (rotating about the y axis): It may be possible to adjust tilting of the half mirror H in order to compensate an installation error of the half mirror H, but when a device for moving a camera (in the x-axial direction) and a device for adjusting tilting-up and down (rotating about the y axis) are mounted on the camera (right-eye camera 2) that receives reflected light, the tilting function of the half mirror H can be removed.

(4) Main barrel (a) Moving forward and backward (in the x-axial direction): The barrel should be able to be moved forward and backward due to a position error, but this function can be replaced by the function of adjusting the focus of a camera, so it may be removed.

(b) Moving up and down (in the z-axial direction): It is advantageous to give this function in preparation for a case when the optical axes of the left-eye and right-eye cameras 4 and 2 are not aligned with the optical axis of the barrel in the vertical direction. When the left-eye and right-eye cameras 4 and 2 can be vertically moved, this function may be removed, but when the optical axes of the left-eye and right-eye cameras 4 and 2 are aligned with each other and the optical axis of the main barrel is at a different height, this function may be used for easier adjustment. The main barrel is fixed during shooting once it is adjusted.

(c) Moving left and right (in the y-axial direction): It is advantageous to remove the function of moving the main barrel left and right, because the left-eye and right-eye cameras 4 and 2 are frequently moved left and right and this function should be able to be performed at any time during shooting.

(d) Panning left and right (rotating about the z axis): This function may be removed when a device for adjusting left-right moving and left-right panning is mounted on the left-eye and right-eye cameras 4 and 2.

(e) Tilting up and down (rotating about the y axis): This function can be replaced by the functions of moving up and down and tilting the cameras 4 and 2.

(f) Focus: The function of adjusting the focus of the main barrel may be achieved by a device that can enlarge the focus area of the main lens (first image formation lens assembly).

These functions are abbreviated in the following Table 2. Table 2 shows parameters that are repetitive and replaceable and parameters that are not repetitive and replaceable when taking stereoscopic images using a monocular perpendicular rig type of stereoscopic camera.

TABLE 2

| | Left-eye camera | Right-eye camera | Half mirror | Barrel |
|---|---|---|---|---|
| Optical axis adjustment parameters | Moving forward and backward (B) | Moving forward and backward (B) | Moving forward and backward (C) | Moving forward and backward (C) |
| | Moving left and right (A) | Moving left and right (A) | Horizontal rolling (C) | Moving up and down (B) |
| | Moving up and down (B) | Moving up and down (B) | Tilting up and down (C) | Moving left and right (C) |
| | Panning left and right (A) | Panning left and right (A) | | Panning left and right (C) |
| | Tilting up and down (C) | Tilting up and down (A) | | Tilting up and down (C) |
| | Horizontal rolling (A) | Horizontal rolling (C) | | Focus (A) |
| | Focus (B) | Focus (B) | | |

(A): parameters that should be adjusted at any time
(B): parameters that can be fixed once being adjusted
(C): removable parameters Referring to Table 2, parameters that should be performed at any time of the parameters to be applied to the left-eye camera are moving left and right, panning left and right, and horizontally rolling, but moving forward and backward, moving up and down, and adjusting a focus are parameters that are not adjusted during shooting once they are performed.

As for the right-eye camera, moving left and right, panning left and right, and tilting up and down are parameters that should be performed at any time, while moving forward and backward, moving up and down, adjusting a focus are not performed once they are performed. As for the main barrel, the focus should be adjustable at any time and moving up and down should be able to be performed so that the main barrel is designed and manufactured to be fixed once being adjusted.

According to this study, it can be seen that the number of parameters that need to be substantially adjusted at any time during shooting are $2^n=2^7=128$. Further, the adjustment parameters reduce to sixty four when the parameter of adjusting the focus of the main barrel is removed.

A monocular perpendicular rig type of stereoscopic camera for substantially accomplishing the result of the study is described hereafter. That is, a monocular perpendicular rig type of stereoscopic camera, in which the left-eye camera can be moved forward and backward, left and right, and up and down, can be horizontally rolled, and has an adjustable focus (that is, the left-eye camera does not need to be tilted up and down and the right-eye camera can be moved forward and backward, left and right, and up and down, can be panned left and right, can be tilted up and down, and has an adjustable focus (that is, the right-eye camera does not need to be horizontally rolled), is described hereafter.

FIG. 7 is a perspective view showing the stereoscopic camera according to the first embodiment of the present invention and FIGS. 8 and 9 are perspective views showing the internal structure of the stereoscopic camera.

The stereoscopic camera 100 is the stereoscopic camera according to the first embodiment of the stereoscopic camera described above and has a configuration for easily, quickly, and simply adjusting the binocular disparity, the convergence angle (panning), tilting, and rolling.

Referring to the figures, the stereoscopic camera 100 includes a first image formation lens assembly 10, a second image formation lens assembly 20, a half mirror H disposed behind the second image formation lens assembly 20, a first camera 30 (a right-eye camera) that takes the image of light reflected from the half mirror H, and a second camera 40 (a left-eye camera) that takes the image of light passing through the half mirror H. In these components, the first and second image formation lens assemblies 10 and 20, the barrel 15, and the half mirror H were described above and those skilled in the art may easily know the installation structures, so they are not described in this case.

The first camera 30 includes a third image formation lens assembly 31 and a camera body 35.

The third image formation lens assembly 31, which is a base lens, makes the image of light reflected from the half mirror H. An imaging plate 36 is disposed in the camera body 35. A macro lens that can perform proximity expansion shooting is used for the third image formation lens assembly 31 in the present invention, which was described above. The third image formation lens assembly 31 may include a diaphragm 32.

The first camera 30 is a right-eye camera, so it can be moved forward and backward (in the x direction), left and right (in the y direction), and up and down (in the z direction), can be panned left and right (rotated (or turned) about the x axis), and can be tilted up and down (rotated (or turned) about the y axis), and its focus can be adjusted.

The forward-backward, left-right, and up-down movement is performed by first, second, and third position adjustment units 110, 120, and 130.

The first position adjustment unit 110 moves the first camera 30 forward and backward (in the x direction). As shown in FIGS. 10 and 11, the first position adjustment unit 110 includes a base plate 11 fixed to a case 101 and oblong holes 103 formed in the case 101.

The base plate 111 is a flat plate having bolt holes 113 formed at a side and the second position adjustment unit 120 is disposed on the base plate 111.

The oblong holes 103, which are formed through the case 101, are elongated forward and backward (in the x direction). The oblong holes 103 correspond to the bolt holes 113, respectively. Accordingly, the base plate 111 can be fixed to the case 101 by securing bolts (not shown in the figures) in the bolt holes 113 through the oblong holes 102. If it is required to move the base plate 111 forward or backward, a user has only to loosen the bolts, move the base plate 111 forward or backward, and then tighten the bolts again.

The second position adjustment unit 120 moves the first camera 30 left and right (in the y direction). As shown in FIGS. 13 to 15, the second position adjustment unit 120 includes upper and lower blocks 121 and 126, an elastic member 129 connecting the lower block 126 and the upper block 121, a moving member moving the upper block 121 by pushing it, and a fixing member fixing the upper block 121 with respect to the lower block 126.

The lower block 126 is fixed to the top of the base plate 111. The upper block 121 is disposed on the top of the lower block 126 and can slide with respect to the lower block 126.

Lower guide bars 126a are longitudinally disposed in the lower block 126 and upper guide bars 121a are longitudinally disposed in the upper block 121. A triangular groove is formed on the sides facing each other of the upper and lower guide bars 121a and 126a and a rod 121b having a square cross-section is fitted in the grooves on the sides. The rods 121b guide the upper block 121 sliding with respect to the lower block 126.

The elastic member 129 has an end supported by a step 126c of the lower block 126 and the other end supported by a step 121c of the upper block 121. The elastic member 129 applies force that moves the steps 121c and 126c away from each other, that is, force that pushes the steps 121c and 126c.

The moving member includes a support 123 and a screw gauge 124 fixed to the support 123.

The support 123 is coupled to a side of the lower block 126. The screw gauge 124 includes a thimble 124a and a spindle 124b that is moved straight when the thimble 124a is rotated. The screw gauge 124 is used for a micrometer etch. because the spindle 124b can be very precisely moved, and accordingly, detailed description of the screw gauge 124 is not provided herein.

An end of the spindle 124b is in contact with a side of the upper block 121. When the thimble 124a is rotated, the spindle 124b moves forward against the pushing force applied by the elastic member 129, so the first camera 30 is moved.

When the thimble 124a is rotated in the opposite direction to the direction described above, the spindle 124 is moved back, in which the side of the upper block 121 can be kept in contact with the spindle 124b by the pushing force applied by the elastic member 129.

The fixing member includes a fixing plate 127a vertically disposed on a side of the lower block 126, a screw rod 127b fixed to a side of the upper block 121, and a knob 127c combined with the screw rod 127b.

An oblong hole 127a is formed through the fixing plate 127a and the screw rod 127b is disposed through the oblong hole 127d. A thread is formed on the outer side of the screw rod 127b and a thread that is fitted to the thread of the screw rod is formed on the inner side of the knob 127c.

Accordingly, when the knob 127c is loosened from the fixing plate 127a by rotating the knob 127c, the upper block 121 can slide with respect to the lower block 126. Further, when the knob 127c is pressed to the fixing plate 127a by rotating the knob 127c in the opposite direction, the upper block 121 is fixed at that position by friction between the fixing plate 127a and the upper block 121.

In order to adjust binocular disparity, the knob 127c is turned to be loosened from the fixing plate 127a and the thimble 124a is rotated such that the spindle 124b is moved forward against the pushing force of the elastic member 129 or moved back by the pushing force of the elastic member 129, so the first camera 30 can be moved. After the first camera 30 is moved, the knob 127c is rotated in the opposite direction to press the fixing plate 127a, thereby fixing the upper block 121 at that position.

The first panning unit 500 is disposed on the second position adjustment unit 120. The first panning unit 500 rotates (or turns) the first camera 30 about the x axis.

As shown in FIGS. 16 to 18, the first panning unit 500 includes a base frame 510, an upper frame 550 that can slide on the base frame 510, sliding rails 560 disposed on the top of the base frame 510, a straight-moving unit for sliding the upper frame 550, and an actuating unit 580 for actuating the straight-moving unit.

The top of the base frame 510 is a curved concave surface and a through-hole 511 is formed through sides of the base frame. An oblong hole 512 is formed at the center of the base frame 510 and is connected with the through-hole 511. A guide projection 513 is formed around the oblong hole 512.

The bottom of the upper frame 550 is fitted to the curved surface and a plurality of bolt holes 551 is formed through sides of the upper frame 550. Since the bottom of the upper frame 550 is fitted to the curved surface, when the upper frame 550 slides on the base frame 510, the upper frame 550 moves along a curved line, which will be described below.

The sliding rails 560 are slidably disposed at sides of the guide projection 513. The bottoms of the sliding rails 560 are formed to be fitted to the curved surface and a plurality of coupling grooves 561 is formed on sides of the sliding rails 560.

When an adjustment bolt 553 inserted in the bolt hole 551 is inserted in the coupling hole 553 and presses the sliding rails 560 to the guide projection 513, the upper frame 550 is fixed to the base frame 510. Further, when the adjustment bolt 553 is inserted in the coupling groove 561, but does not press the sliding rails 560, the upper frame 550 can slide with respect to the base frame 510 together with the sliding rails 560.

The straight-moving unit includes a moving block 571 that is slidably disposed in the oblong hole 512 and a connecting pin 573 for connecting the moving block 571 and the upper frame 550. Further, the actuating unit 580 includes a coupling block 581 disposed on a side of the base frame 510 and a screw gauge 585 disposed through the coupling block 581.

A through-hole is formed in the coupling block 581, and when the coupling block 581 is combined with the base frame 510, the through-hole is connected to the through-hole 511.

The screw gauge 585 includes a thimble and a spindle that is moved straight when the thimble is rotated, but a screw gauge was described above, so detailed description is not provided in this case.

Figure 19B:
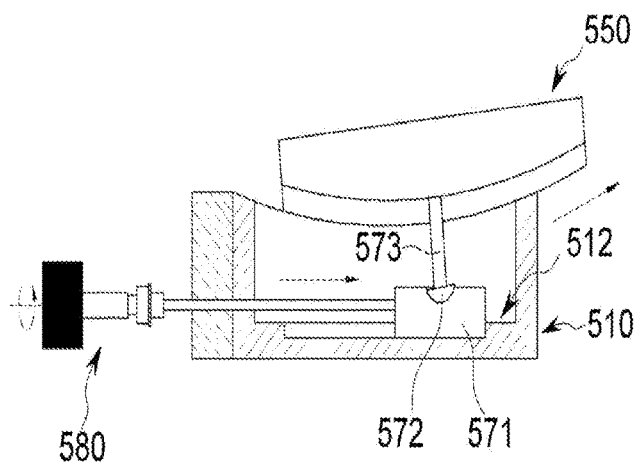
Figure 19C:
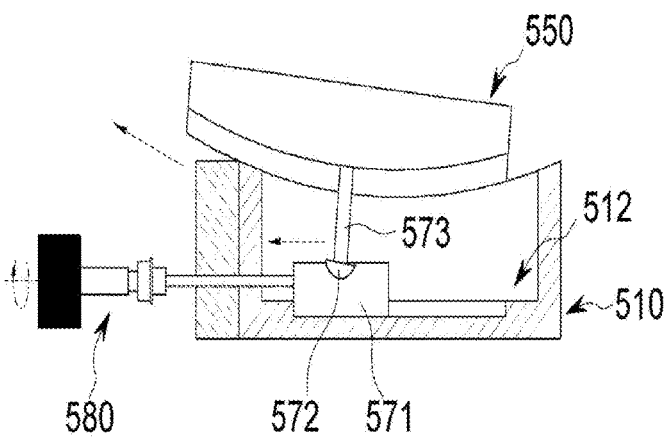

The moving block 571, as shown in FIGS. 17 to 19, is connected to an end of the spindle, so it is moved straight in the oblong hole 512 when the spindle is moved forward and backward. A semicircular groove is formed on the top of the moving block 571 and a semispherical hub 572 is seated in the groove. The hub 572 can freely swing in the groove.

The connecting pin 573 has a lower end fitted in the hub 572 and an upper end coupled to the upper frame 550. When the moving block 571 is moved forward or backward from the position shown in FIG. 19a, the hub 572 can freely swing in contact with the groove, and accordingly, the upper frame 550 slides on the top of the base frame 510.

As described above, the first panning unit 500 rotates (or turns) the first camera 30 about the x axis and this process is briefly described hereafter.

First, the adjustment bolt 553 is loosened so that the upper frame 550 and the sliding rails 560 can slide with respect to the base frame 510.

Next, when the moving block 571 is moved forward and backward in the oblong hole 512 by rotating the screw gauge 585, the upper frame 550 swings along the curved surface of the base frame 510, as shown in FIG. 19. When the upper frame 550 swings at a desired angle, the adjustment bolt 553 is tightened to be inserted into the coupling groove 561 and presses the sliding rails 560 to the guide projection 513, whereby the upper frame 550 is fixed at that position.

On the other hand, a holder 170 is vertically disposed on the top of the upper frame 550 and has a tilting unit 600. The tilting unit 600 has the same structure as the first panning unit 500 except that it is disposed vertically (in the z-axial direction). Accordingly, when the screw gauge 585 is rotated for tilting, the upper frame 550 swings (or turns) about the y axis on the base frame 510, and accordingly, the first camera 30 is also rotated (or turned) about the y axis.

The third position adjustment unit 130 is disposed on the upper frame 550 of the tilting unit 600. The third position adjustment unit 130 moves the first camera 30 vertically (in the z-axial direction).

The third position adjustment unit 130 includes an adjustment block 131 mounted on the upper frame 550, a fixing bolt 133 coupled to the adjustment block 131, and a sliding plate 135 slidably vertically disposed on the adjustment block 131. Rails are formed vertically (in the z-axial direction) on a side of the sliding plate 135 and a fixing ring 137 for fixing the first camera 30 is formed on the opposite side of the sliding plate 135.

The fixing bolt 133 may be loosened so that the sliding plate 135 can vertically move or may be tightened so fix the sliding plate 135, and the configuration for tightening or loosening the fixing bolt 133 is well known to those skilled in the art such that they can easily know the structure, so it is not described herein.

On the other hand, FIG. 12 is a perspective view showing the second camera 40. Reference numerals of the reference numeral in FIG. 12 indicate the same components indicated by the same reference numerals in FIGS. 1 to 11.

The second camera 40 includes a third image formation lens assembly 41 and a camera body 45.

The third image formation lens assembly 41, which is a base lens, makes the image of light passing through the half mirror H. An imaging plate 46 is disposed in the camera body 45. A macro lens that can perform proximity expansion shooting is used for the third image formation lens assembly 41 in the present invention, which was described above. The third image formation lens assembly 41 may include a diaphragm 42.

The second camera 40 is a left-eye camera, so it can be moved forward and backward (in the x direction), left and right (in the y direction), and up and down (in the z direction), can be panned left and right (rotated (or turned) about the z axis), and can be rolled (rotated (or turned) about the x axis, and the focus of the second camera 40 is adjustable.

The forward-backward, left-right, and up-down movement is performed by fourth, fifth, and sixth position adjustment units 140, 150, and 160. In detail, the fourth position adjustment unit 140 moves the second camera 40 forward and backward (in the x direction), the fifth position adjustment unit 150 moves the second camera 4 left and right (in the y direction), and the sixth position adjustment unit 160 moves the second camera 40 up and down (in the z direction).

The fifth position adjustment unit 150 is disposed on the base plate 111. The base plate 111 is fixed to the case 101, which was described above.

The fifth position adjustment unit is the same as the first position adjustment unit 110 in the structure and operation process, except that the installation direction is different, as compared with the first position adjustment unit 110.

That is, the fifth position adjustment unit 150 has the structure shown in FIGS. 13 to 15. In detail, the upper block 121 is loosened from the fixing plate 127a by rotating the thimble 124a so that the upper block 121 can slide and then the thimble 124a is loosened so that the spindle 124b is moved forward against the pushing force by the elastic member 129 or is moved backward by the pushing force of the elastic member 120, and accordingly, the second camera 40 is moved left or right. After the second camera 40 is moved, the thimble 124a is rotated in the opposite direction so that the spindle 124b presses the fixing plate 127a, thereby fixing the upper block 121 at that position.

A second panning unit 700 is disposed on the upper block 121. The second panning unit 700 rotates (or turns) the second camera 40 about the z axis. The second panning unit 700 is the same as the first panning unit 500 in the configuration and operation process, except that the installation direction is different, as compared with the first panning unit 500.

That is, the second panning unit 700 has the structure shown in FIGS. 16 to 19. In detail, the adjustment bolt 553 is loosened so that the upper frame 550 and the sliding rails 560 can slide with respect to the base frame 510, and then, the moving block 571 is moved forward and backward in the oblong hole 512 by rotating the screw gauge 585, whereby the upper frame 550 swings on the curved top of the base frame 510. When the upper frame 550 finishes swinging at a desired angle, the adjustment bolt 553 is tightened to press the sliding rails 560 to the guide protrusion 513, whereby the upper frame 550 is fixed at that position.

Meanwhile, the holder 170 is disposed on the top of the upper frame 550. The sixth position adjustment unit 160 is disposed on the holder 170 and moves the second camera 40 up and down. The sixth position adjustment unit 160 has a plurality of oblong holes 161 vertically (in the z direction) with respect to the holder 170 and bolts (not shown) secured in the upper frame 550 through the oblong holes 161.

The bolts are loosened so that the holder 170 can move up and down, the vertical position of the second camera 40 is adjusted, and then the bolts are tightened again, thereby fixing the vertical position of the second camera 40.

A rolling unit 800 is disposed under the holder 170. The rolling unit 800 rotates (or turns) the second camera 40 about the x axis. The rolling unit 800 is the same as the first panning unit 500 in the configuration and operation process, except that the installation direction is different, as compared with the first panning unit 500. That is, the rolling unit 800 has the structure shown in FIGS. 16 to 19.

The fourth position adjustment unit 140 is disposed under the rolling unit 800. The fourth position adjustment unit 140 moves the second camera 40 forward and backward (in the x-axial direction). The fourth position adjustment unit 140 is the same as the third position adjustment unit 130 in the configuration and operation method except that the installation direction is different, as compared with the third position adjustment unit 130. That is, the fixing bolt 133 is loosened so that the sliding plate 135 can horizontally move, the second camera 40 is moved forward and backward, and then the second camera 40 is fixed at that position by tightening the fixing bolt 133.

Meanwhile it is assumed that the first camera 30 that makes the image of the light reflected from the half mirror H is the right-eye camera and the second camera 40 that makes the image of the light passing through the half mirror H is the left-eye camera, but this assumption may be changed. That is, it may be possible to assume that the first camera 30 that makes the image of the light reflected from the half mirror H is the left-eye camera and the second camera 40 that makes the image of the light passing through the half mirror H is the right-eye camera; however, this will be apparent to those skilled in the art.

Further, although the left-eye camera 40 is equipped with the rolling unit 800 and the right-eye camera 30 is not equipped with a rolling unit in the above description, it may be possible to replace the rolling unit on a camera by making the half mirror H be rotatable about the x axis instead of equipping the left-eye camera 40 and the right-eye camera 30 with a rolling unit.

The invention claimed is:
1. A monocular stereoscopic camera comprising:
a first image formation lens assembly;
a half mirror (H) reflecting at least a part of light passing through the first image formation lens assembly and transmitting the remaining light;
a first camera including a first third image formation lens assembly making an image of the light reflected from the half mirror (H);
a second camera including a second third image formation lens assembly making an image of the light passing through the half mirror (H) and disposed perpendicularly to the first camera;
a tilting unit rotating the first camera about a y axis;
a first panning unit rotating the first camera about an x axis;
first, second, and third position adjustment units, capable of selectively moving the first camera straight along the x axis, the y axis, and a z axis to adjust a position of the first camera;
a second panning unit rotating the second camera about the z axis
a rolling unit rotating the second camera about the x axis; and
fourth, fifth, and sixth position adjustment units capable of selectively moving the second camera along the x axis, the y axis, and the z axis to adjust a position of the second camera,
wherein the first image formation lens assembly is arranged in the x-axial direction, light travels in the x-axial direction, and the x axis, the y axis, and the z axis are three axes perpendicular to each other,
wherein
the tilting unit, the first and second panning units and the rolling unit each include:
a base frame having a top that is a concave curved surface, having an oblong hole formed on the top, and having a guide projection around the oblong hole;
an upper frame having a bottom that is a convex surface fitted to the curved surface and having bolt holes formed at a side thereof;
sliding rails disposed on the top to be guided to slide by the guide projection and having coupling grooves at a side thereof;
a straight-moving unit including a moving block capable of moving straight along the oblong hole inside the oblong hole and having a semispherical groove formed on a top thereof, a hub having a semispherical shape and capable of freely swing inside the groove, and a connecting pin having a lower end coupled to the hub and an upper end coupled to the upper frame; and
an actuating unit disposed on the base frame and moving straight the moving block by pushing or puling the moving block,
wherein when an adjustment bolt inserted in the bolt hole is inserted into the coupling groove and presses the sliding rails, the upper frame is fixed to the base frame, and when the adjustment bolt does not press the sliding rails, the upper frame can slide with respect to the base frame.

2. A monocular stereoscopic camera comprising,
a first image formation lens assembly;
a half mirror (H) reflecting at least a part of light passing through the first image formation lens assembly and transmitting the remaining light;
a first camera including a first third image formation lens assembly making an image of the light reflected from the half mirror (H);
a second camera including a second third image formation lens assembly making an image of the light passing through the half mirror (H) and disposed perpendicularly to the first camera;
a tilting unit rotating the first camera about a y axis;
a first panning unit rotating the first camera about an x axis;
first, second, and third position adjustment units capable of selectively moving the first camera straight along the x axis, the y axis, and a z axis to adjust a position of the first camera;
a second panning unit rotating the second camera about the z axis,
a rolling unit rotating the second camera about the x axis; and
fourth, fifth, and sixth position adjustment units capable of selectively moving the second camera along the x axis, the y axis, and the z axis to adjust a position of the second camera,
wherein the first image formation lens assembly is arranged in the x-axial direction, light travels in the x-axial direction, and the x axis, the y axis, and the z axis are three axes perpendicular to each other
wherein
the second and fifth position adjustment units and selectively move the first and second cameras along the y axis,
the second and fifth position adjustment units each include:
a lower block;
an upper block slidably disposed on the lower block;
an elastic member connecting the lower block and the upper block to each other;
a moving member moving the upper block by pushing the upper block; and
fixing member fixing the upper block with respect to the lower block, and
the moving member slides the upper block against elasticity of the elastic member and fixes the upper block to the lower block using the fixing member after the sliding.

* * * * *